(12) United States Patent
Ikedo et al.

(10) Patent No.: US 10,407,062 B2
(45) Date of Patent: Sep. 10, 2019

(54) DRIVING ASSISTANCE APPARATUS

(71) Applicant: TOYOTA JIDOSHA KABUSHIKI KAISHA, Toyota-shi, Aichi-ken (JP)

(72) Inventors: Yuji Ikedo, Sunto-gun (JP); Tomonori Akiyama, Susono (JP); Ryo Morishita, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/848,947

(22) Filed: Dec. 20, 2017

(65) Prior Publication Data

US 2018/0178788 A1 Jun. 28, 2018

(30) Foreign Application Priority Data

Dec. 26, 2016 (JP) ................................. 2016-250762

(51) Int. Cl.
*B60W 30/095* (2012.01)
*B60W 50/08* (2012.01)
*B60W 50/14* (2012.01)
*G06K 9/00* (2006.01)

(52) U.S. Cl.
CPC ...... *B60W 30/0956* (2013.01); *B60W 50/082* (2013.01); *B60W 50/14* (2013.01); *G06K 9/00805* (2013.01)

(58) Field of Classification Search
CPC .......... B60W 30/146; B60W 2550/14; B60W 2550/22; B60W 2550/141; G06K 9/00818
See application file for complete search history.

(56) References Cited

U.S. PATENT DOCUMENTS

2014/0028451 A1    1/2014    Takahashi et al.

FOREIGN PATENT DOCUMENTS

| JP | 5435172 B2 | 3/2014 |
| JP | 2015118581 A * | 6/2015 |
| JP | 2017-54411 A | 3/2017 |

OTHER PUBLICATIONS

JP-2015118581-A, Sugiyama Akira 2015 (Year: 2015).*

* cited by examiner

*Primary Examiner* — Anne M Antonucci
*Assistant Examiner* — Renee LaRose
(74) *Attorney, Agent, or Firm* — Oliff PLC

(57) ABSTRACT

A driving assistance apparatus includes a host vehicle information acquisition device configured to acquire host vehicle information including a vehicle speed of a host vehicle and a signal indicating that braking force is applied to the host vehicle by a braking device of the host vehicle, a target information acquisition device configured to acquire target information including a relative position of a target present on the periphery of the host vehicle for the host vehicle, an advancing direction of the target, and a speed of the target, and an electronic control device.

4 Claims, 8 Drawing Sheets

DRIVING ASSISTANCE APPARATUS

INCORPORATION BY REFERENCE

The disclosure of Japanese Patent Application No. 2016-250762 filed on Dec. 26, 2016 including the specification, drawings and abstract is incorporated herein by reference in its entirety.

BACKGROUND

1. Technical Field

The present disclosure relates to a driving assistance apparatus having a function of warning a driver of a vehicle in a case where there is a probability that a target may cross a route (hereinafter, simply referred to as an "expected route") that the vehicle passes.

2. Description of Related Art

In the related art, there is a driving assistance apparatus that is mounted on a vehicle and warns a driver of the vehicle in a case where there is a probability that a target may cross an expected route of the vehicle (hereinafter, the vehicle mounted with the driving assistance apparatus will be referred to as a "host vehicle").

For example, a device (hereinafter, referred to as a "related art device") disclosed in Japanese Patent No. 5435172 (JP 5435172 B) sets a linear route extending behind a host vehicle from the host vehicle and having a predetermined length as an expected route (described as a boundary line in the above patent document) when the host vehicle moves backward, and gives a warning (described as a warning operation in the above patent document) in a case where the device determines that there is a probability that a target may cross the expected route within a time threshold value.

The configuration of the related art device may also be applicable to a case where a host vehicle moves forward. In this case, the related art device sets a linear route extending in front of a host vehicle from the host vehicle and having a predetermined length as an expected route, and gives a warning in a case where the device determines that there is a probability that a target may cross the expected route within a time threshold value.

SUMMARY

Meanwhile, a length of an expected route is naturally set to an appropriate length at which there is a probability that a host vehicle may collide with a target or may come close to the target in a case where the target reaches a portion of the expected route included in the length within a time threshold value. However, when a length of an expected route is set to an "appropriate length in a case where a host vehicle travels at a general speed", the length of the expected route is excessively large, for example, in a case where the host vehicle decelerates and travels at a low speed in order to be stopped in front of a traffic signal and a case where the host vehicle is stopped based on a stop sign, and, as a result, a driver may be troubled due to an unnecessary warning.

The present disclosure provides a driving assistance apparatus capable of giving a more appropriate warning to a driver of a host vehicle.

An aspect of the present disclosure relates to a driving assistance apparatus including a host vehicle information acquisition device, a target information acquisition device, and an electronic control device. The target information acquisition device is configured to acquire host vehicle information including a vehicle speed of a host vehicle and a signal indicating that braking force is applied to the host vehicle by a braking device of the host vehicle. The target information acquisition device is configured to acquire target information including a relative position of a target present on the periphery of the host vehicle for the host vehicle, an advancing direction of the target, and a speed of the target; and an electronic control device configured as follows. The electronic control device determines that a traveling state of the host vehicle has transitioned to a low-speed transition state based on the host vehicle information in a case where the vehicle speed is reduced to a first vehicle speed threshold value or less from a vehicle speed more than the first vehicle speed threshold value, and in a case where the braking force is applied. The electronic control device determines that the traveling state has transitioned to a low-speed state from the low-speed transition state in a case where a state in which the braking force is applied is maintained for a first time threshold value or more from a first time point at which the electronic control device determines that the traveling state has transitioned to the low-speed transition state. The electronic control device estimates a linear route having a predetermined length extending in an advancing direction of the host vehicle from the host vehicle as an expected route based on the host vehicle information. The electronic control device sets the predetermined length of the expected route to a first length at least in a period from the first time point to a second time point at which the traveling state is determined as having transitioned to the low-speed state, and sets the predetermined length of the expected route to a second length smaller than the first length at the second time point. The electronic control device determines whether or not there is an objective target as a target that may probably cross the expected route within a time threshold value based on the target information. The electronic control device generates a request signal for warning a driver of the host vehicle in a case where the electronic control device determines that the objective target is present. The electronic control device warns the driver in response to the request signal.

According to the aspect of the present disclosure, a predetermined length of an expected route is set to the second length smaller than the first length at a time point (second time point) at which a traveling state is determined as having transitioned to the low-speed state from the low-speed transition state. Here, according to a determination criterion in the electronic control device, there is a higher probability that the host vehicle may travel at a vehicle speed that is equal to or less than the first vehicle speed threshold value, or may be stopped at the time point (second time point) at which a traveling state is determined as having transitioned to the low-speed state from the low-speed transition state. Therefore, according to the aspect of the present disclosure, in a case where there is a higher probability that the host vehicle may travel at a vehicle speed that is equal to or less than the first vehicle speed threshold value, or may be stopped, a predetermined length of an expected route may be set to the second length. Thus, in this case, a length of each expected route can be restrained from being excessively increased, and thus a possibility that an unnecessary warning is given can be considerably reduced. Therefore, a more appropriate warning can be given to a driver of the host vehicle.

In the driving assistance apparatus according to the aspect of the present disclosure, the electronic control device may be configured to determine that the traveling state has transitioned to a starting state from the low-speed state in a case where the vehicle speed increases to a second vehicle speed threshold value or more that is greater than the first vehicle speed threshold value, and the braking force is not applied in a state in which the electronic control device determines that the traveling state has transitioned to the low-speed state. The electronic control device may be configured to determine that the traveling state has transitioned to an advancing state from the starting state in a case where a state in which the braking force is not applied is maintained for a second time threshold value or more from a third time point at which the electronic control device determines that the traveling state has transitioned to the starting state. The electronic control device may be configured to determine that the traveling state has transitioned to the low-speed transition state from the advancing state in a case where the vehicle speed is equal to or less than the first vehicle speed threshold value, and the braking force is applied, in a state in which the electronic control device determines that the traveling state has transitioned to the advancing state. The electronic control device may be configured to set the length to the second length in a case where the electronic control device determines that the traveling state is the low-speed state or the starting state. The electronic control device may be configured to set the length to the first length in a case where the electronic control device determines that the traveling state is the advancing state or the low-speed transition state.

According to the aspect of the present disclosure, in a case where a traveling state is determined as being the advancing state or the low-speed transition state, a predetermined length of each expected route is set to the first length, and, in a case where a traveling state is determined as being the low-speed state or the starting state, a predetermined length of an expected route is set to the second length smaller than the first length. Here, according to the determination criterion in the electronic control device, in a case where a traveling state is determined as being the advancing state, there is a higher probability that the host vehicle may advance without being positively decelerated (that is, without the braking force being applied due to a driver operating the braking device). In a case where a traveling state is determined as being the low-speed transition state, there is a higher probability that the host vehicle may be decelerated from an advancing state, but the time in which the deceleration is being performed does not reach the first time threshold value yet. In a case where a traveling state is determined as being the low-speed state, there is a higher probability that the host vehicle may travel at a vehicle speed that is equal to or less than the first vehicle speed threshold value, or may be stopped. In a case where a traveling state is determined as being the starting state, there is a higher probability that the host vehicle may begin to be started, but the time in which the starting state is maintained does not reach the second time threshold value yet.

Therefore, according to the aspect of the present disclosure, "in a case where there is a higher probability that the host vehicle may advance without being positively decelerated (advancing state)", and "in a case where there is a higher probability that the host vehicle may be decelerated from an advancing state, but the time in which the deceleration is being performed does not reach the first time threshold value yet (low-speed transition state)", a predetermined length of an expected route may be set to the first length. "In a case where there is a higher probability that the host vehicle may travel at the vehicle speed that is equal to or less than the first vehicle speed threshold value, or may be stopped (low-speed state)", and "in a case where there is a higher probability that the host vehicle may begin to be started, but the time in which the starting state is maintained does not reach the second time threshold value yet (starting state)", a predetermined length of an expected route may be set to the second length. According to the above-described configuration, a length of an expected route can be set to an appropriate length corresponding to a traveling state of the host vehicle, and thus a possibility that an unnecessary warning is given can be considerably reduced. Therefore, a more appropriate warning can be given to a driver of the host vehicle.

In the driving assistance apparatus according to the aspect of the present disclosure, the electronic control device may be configured to determine that the traveling state has transitioned to the advancing state from the low-speed transition state in a case where the braking force is not applied in a state in which the electronic control device determines that the traveling state has transitioned to the low-speed transition state.

According to the above-described configuration, the braking force is needed to be continuously applied in order to maintain the low-speed transition state. Thus, in a case where a traveling state is determined as being the low-speed transition state, there is a higher probability that the host vehicle may be decelerated from an advancing state. Therefore, a traveling state of the host vehicle can be more accurately determined.

In the driving assistance apparatus according to the aspect of the present disclosure, the electronic control device may be configured to determine that the traveling state has transitioned to the low-speed state from the starting state in a case where the braking force is applied in a state in which the electronic control device determines that the traveling state has transitioned to the starting state.

According to the above-described configuration, a state in which the braking force is not applied is needed to be maintained in order to maintain the starting state. Thus, in a case where a traveling state is determined as being the starting state, there is a higher probability that the host vehicle may begin to be started. Therefore, a traveling state of the host vehicle can be more accurately determined.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiment

Figure 1:
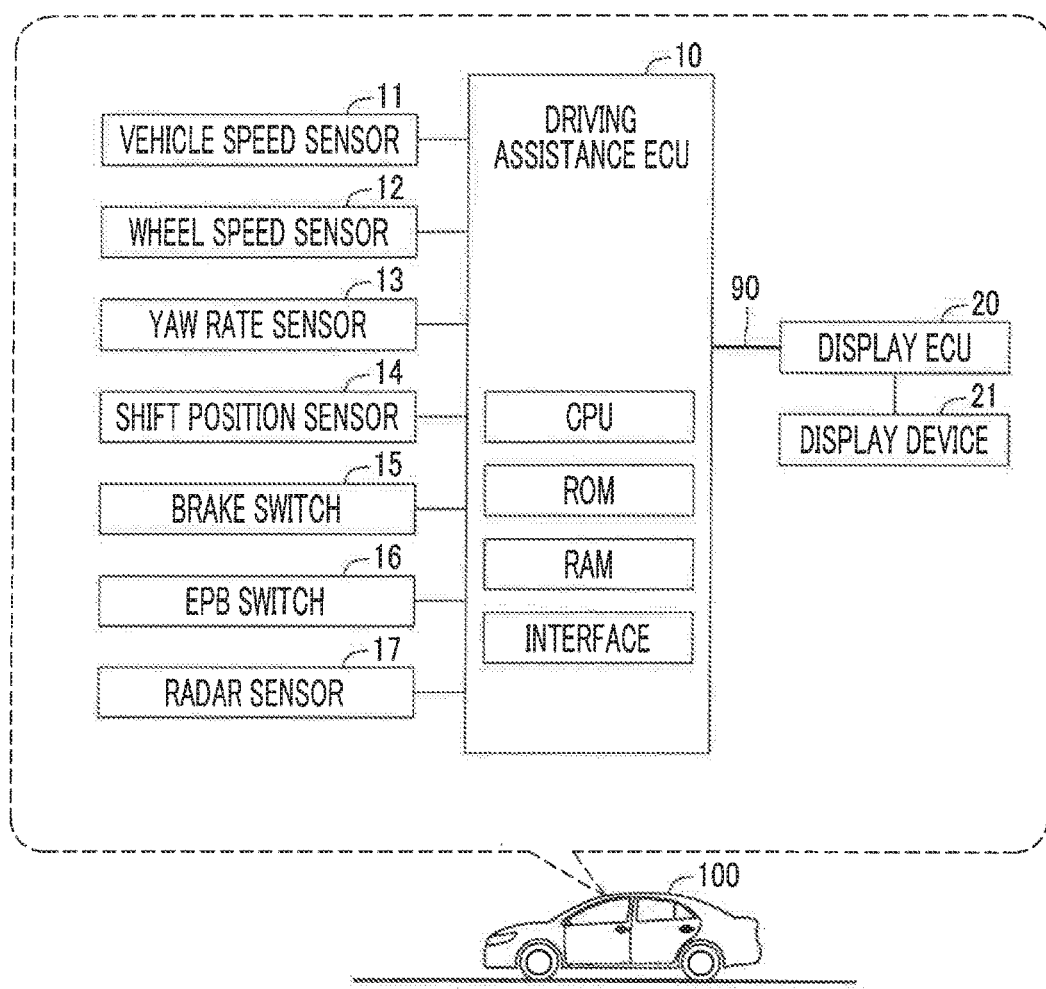
FIG. 1 is a diagram illustrating a driving assistance apparatus (hereinafter, referred to as a "present embodiment apparatus") according to an embodiment of the present disclosure, and a vehicle to which the driving assistance apparatus is applied.

Hereinafter, with reference to the drawings, a description will be made of a driving assistance apparatus (hereinafter, referred to as a "present embodiment apparatus") according to an embodiment. The present embodiment apparatus is applied to a vehicle 100 illustrated in FIG. 1. The vehicle 100 is an automobile using an engine (not illustrated) as a power source. As illustrated in FIG. 1, the present embodiment apparatus includes a driving assistance ECU 10 and a display ECU 20.

An ECU stands for an electronic control unit, and each of the driving assistance ECU 10 and the display ECU 20 is an electronic control circuit having, as a main constituent element, a microcomputer including a CPU, a ROM, a RAM, and an interface. The CPU realizes various functions which will be described later by executing an instruction (routine) stored in a memory (ROM). The ECUs may be integrated into a single ECU.

The driving assistance ECU 10 and the display ECU 20 are connected to each other via a communication/sensor system controller area network (CAN) 90 such that data can be exchanged therebetween (communication can be performed with each other).

The vehicle 100 includes a vehicle speed sensor 11, a wheel speed sensor 12, a yaw rate sensor 13, a shift position sensor 14, a brake switch 15, an electric parking brake switch 16, a radar sensor 17, and a display device 21. The sensors 11 to 14, 17 and the switches 15, 16 are connected to the driving assistance ECU 10, and the display device 21 is connected to the display ECU 20. The vehicle 100 includes a plurality of sensors detecting a driving state of the vehicle 100 in addition to the above-described sensors, but, in the present embodiment, solely sensors related to a configuration of the driving assistance apparatus disclosed in the present specification will be described.

The vehicle speed sensor 11 measures a speed (vehicle speed) SPDv [k/h] of the vehicle 100, and outputs a signal indicating the vehicle speed SPDv to the driving assistance ECU 10. The driving assistance ECU 10 acquires the vehicle speed SPDv whenever a predetermined calculation time Tcal [s] elapses based on the signal received from the vehicle speed sensor 11.

The wheel speed sensor 12 is provided at each of right and left front wheels (not illustrated) of the vehicle 100 and right and left rear wheels (not illustrated) thereof. Each wheel speed sensor 12 measures a rotation speed (hereinafter, referred to as a wheel speed) WS [rps] of each wheel, and outputs a signal indicating the wheel speed WS to the driving assistance ECU 10. The driving assistance ECU 10 acquires the wheel speed WS of each wheel whenever the calculation time Tcal elapses based on the signal received from each wheel speed sensor 12.

The yaw rate sensor 13 measures an angular velocity (yaw rate) Y [°/sec] of the vehicle 100, and outputs a signal indicating the yaw rate Y to the driving assistance ECU 10. The driving assistance ECU 10 acquires the yaw rate Y whenever the calculation time Tcal elapses based on the signal received from the yaw rate sensor 13.

The shift position sensor 14 detects a shift position (including a P range that is a parking range) of a shift lever (not illustrated), and outputs a signal indicating the shift position to the driving assistance ECU 10. The driving assistance ECU 10 acquires the shift position whenever the calculation time Tcal elapses based on the signal received from the shift position sensor 14. The vehicle 100 is mounted with a well-known automatic transmission (not illustrated). As is well known, when a shift position of the shift lever is moved to the P range, the automatic transmission is set to a mechanically rotation impossible state, and thus the vehicle 100 can be maintained in a stoppage state.

The brake switch 15 is provided at a brake pedal (not illustrated). When a driver puts the foot thereof on the brake pedal, the brake switch 15 changes from an OFF state to an ON state, and outputs a signal indicating the ON state to the driving assistance ECU 10 while the driver is putting the foot thereof on the brake pedal. The driving assistance ECU 10 acquires a state of the brake switch 15 whenever the calculation time Tcal elapses based on the signal received from the brake switch 15. The vehicle 100 is mounted with a well-known braking device (not illustrated). When the foot of the driver is put on the brake pedal, the braking force is applied to the vehicle 100 by the braking device.

The electric parking brake switch (hereinafter, referred to as an EPB switch) 16 is provided near a driver seat, and is electrically connected to a well-known electric parking brake mounted on the vehicle 100. Operation modes of the EPB switch 16 include two types such as a manual mode and an automatic mode. The manual mode is a mode in which the driver operates the EPB switch 16, and the automatic mode is a mode in which the EPB switch 16 switches between an ON state and an OFF state in conjunction with operations on the shift lever and an accelerator pedal (not illustrated). In the present embodiment apparatus, the EPB switch 16 is set to the manual mode.

When the EPB switch 16 is turned on by the driver, the electric parking brake works, and thus the braking force is applied to the vehicle 100. At this time, the EPB switch 16 changes from an OFF state to an ON state, and outputs a signal indicating the ON state to the driving assistance ECU 10. The EPB switch 16 outputs the signal indicating the ON state to the driving assistance ECU 10 while the EPB switch 16 is in the ON state. On the other hand, when the EPB switch 16 is turned off by the driver, the electric parking brake is canceled, and thus application of the braking force to the vehicle 100 is canceled.

The radar sensor 17 is provided at each of a right end and a left end of a front end portion of the vehicle 100. The respective radar sensors 17 transmit electric waves diagonally right forward and diagonally left forward of the vehicle 100. In a case where there is an object such as another vehicle or a pedestrian within an arrival range of the electric waves (hereinafter, referred to as transmitted waves), the transmitted waves are reflected at the object. Each radar sensor 17 receives the transmitted wave (hereinafter, referred to as a reflected wave) which has been reflected. Each radar sensor 17 outputs a signal indicating the transmitted wave and a signal indicating the reflected wave to the driving assistance ECU 10. Hereinafter, an object present within the arrival range of the electric wave will be referred to as a "target".

The driving assistance ECU 10 determines whether or not there is a target that may probably cross an expected route of the vehicle 100 within a threshold time (which will be described later), generates a request signal for giving a warning to the driver of the vehicle 100 in a case where the driving assistance ECU 10 determines that there is the target, and transmits the request signal to the display ECU 20.

The display device 21 is provided at a position (for example, inside a meter cluster panel) which can be visually recognized from the driver seat of the vehicle 100. When the request signal is received from the driving assistance ECU 10, the display ECU 20 transmits a command signal to the display device 21. When the command signal is received from the display ECU 20, the display device 21 performs display for giving a warning to the driver. The display device 21 may be a head-up display, a center display, and the like.

Summary of Operation of Present Embodiment Apparatus

Next, a description will be made of a summary of an operation of the present embodiment apparatus. The present embodiment apparatus performs two types of determinations including a traveling state determination and a warning determination. The traveling state determination is a determination of identifying which one of the following states described later in detail, that is, a low-speed state S1, a starting state S2, an advancing state S3, and a low-speed transition state S4 a traveling state of the vehicle 100 is. The warning determination is a determination of whether or not there is a target (hereinafter, referred to as an "objective target") that may probably cross a "linear expected route of the vehicle 100 having a predetermined length" within the threshold time. The present embodiment apparatus changes the "predetermined length" of the expected route in the warning determination based on a determination result in the traveling state determination. Hereinafter, a detailed description will be made.

A. Operation Common to Traveling State Determination and Warning Determination Acquisition of Host Vehicle Information First, a description will be made of an operation common to the traveling state determination and the warning determination. When an engine switch (ignition key switch) (not illustrated) of the vehicle 100 is turned on, the driving assistance ECU 10 acquires, as host vehicle information, a vehicle speed SPDv(n), a wheel speed WS(n), a yaw rate Y(n), a shift position, a state of the brake switch 15, and a state of the EPB switch 16 (that is, a driving state of the vehicle 100) based on signals received from the sensors 11 to 14 and the switches 15, 16 whenever the calculation time Tcal elapses until the engine switch is turned off, and stores the host vehicle information in the RAM of the driving assistance ECU 10.

Hereinafter, a period from turning-on of the engine switch to turning-off thereof will be referred to as an "engine ON period". With respect to any element e, the element e in a calculation cycle of an n-th cycle is indicated by e(n), and a time point at which the engine switch is turned on is defined as n=0. For example, the vehicle 100 may be a hybrid vehicle or an electric vehicle. In this case, turning-on of a start-up switch (for example, a ready switch) for setting the vehicle 100 to a traveling possible state is the same meaning as turning-on of the engine switch, and turning-off of the start-up switch is the same meaning as turning-off of the engine switch.

B. Operation Regarding Traveling State Determination

Figure 2:
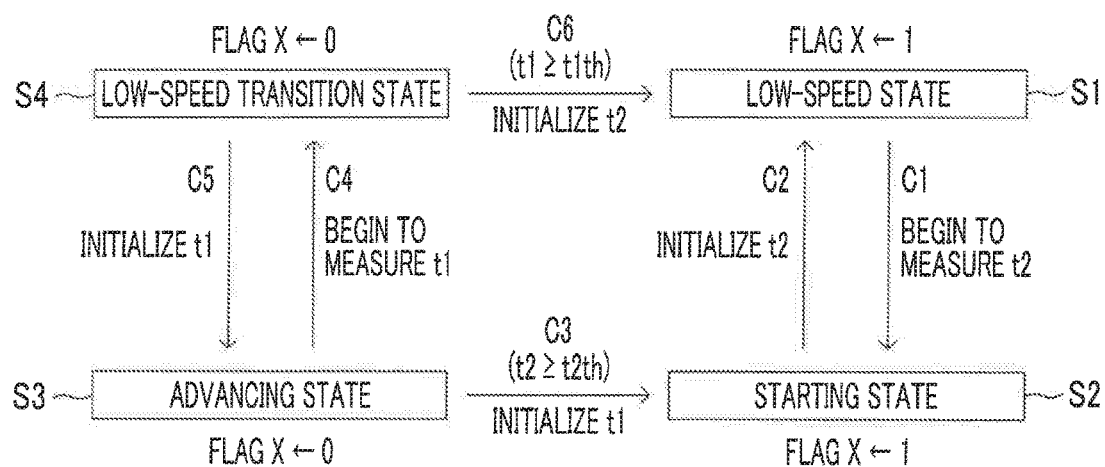
FIG. 2 is a diagram illustrating transition of a traveling state of a host vehicle.

Next, with reference to FIG. 2, a description will be made of an operation regarding the traveling state determination. First, a description will be made of a summary of the traveling state determination. In the present embodiment apparatus, a traveling state of the vehicle 100 is classified into the following four states, that is, the low-speed state S1, the starting state S2, the advancing state S3, and the low-speed transition state S4 according to a driving state of the vehicle 100. In the traveling state determination, a determination is performed in order to identify which one of the four states a traveling state of the vehicle 100 corresponds to during the engine ON period based on host vehicle information that is information indicating a driving state of the vehicle 100 whenever the calculation time Tcal elapses. In the present embodiment apparatus, a traveling state of the vehicle 100 at the time point (n=0) at which the engine switch is turned on is defined to be the low-speed state S1. A traveling state of the vehicle 100 transitions to the starting state S2 from the low-speed state S1 when a condition C1 (which will be described later) is established. A traveling state of the vehicle 100 transitions to the low-speed state S1 from the starting state S2 when a condition C2 (which will be described later) is established, and transitions to the advancing state S3 when a condition C3 (which will be described later) is established. A traveling state of the vehicle 100 transitions to the low-speed transition state S4 from the advancing state S3 when a condition C4 (which will be described later) is established. A traveling state of the vehicle 100 transitions to the advancing state S3 from the low-speed transition state S4 when a condition C5 (which will be described later) is established, and transitions to the low-speed state S1 when a condition C6 (which will be described later) is established.

As described above, in the warning determination, a predetermined length of an expected route is changed based on a determination result in the traveling state determination. A length of the expected route is small in a case of a state in which the vehicle 100 is not started at a low speed, or a state in which the vehicle 100 begins to be started (that is, in a case where a probability of sudden forward advancing is low), and a length of the expected route is large in a case of a state in which the vehicle 100 is advancing or a state in which a probability of return to an advancing state is high (that is, in a case where a probability of sudden forward advancing is high). As will be described later in detail, in a case where a traveling state is the low-speed state S1 or the starting state S2, a probability that the vehicle 100 suddenly advances forward is considered to be low, and, in a case where a traveling state is the advancing state S3 or the low-speed transition state S4, a probability that the vehicle 100 suddenly advances forward is considered to be high. Thus, in the traveling state determination, in a case where the driving assistance ECU 10 determines that a traveling state is the low-speed state S1 or the starting state S2, a value of a flag X that is a flag indicating a state in which a probability of sudden forward advancing is lower is set to 1, and, in a case where the driving assistance ECU 10 determines that a traveling state is the advancing state S3 or the low-speed transition state S4, a value of the flag X is set to 0. In the warning determination, a length of the expected route is set to a first length in a case where a value of the flag X is 0, and a length of the expected route is set to a second length smaller than the first length in a case where a value of the flag X is 1. Hereinafter, a traveling state determination method will be described in detail.

As described above, in the present embodiment apparatus, a traveling state of the vehicle 100 at the time point (n=0) at which the engine switch is turned on is defined to be the low-speed state S1. Thus, the driving assistance ECU 10 of the present embodiment apparatus determines that a traveling state of the vehicle 100 in the 0-th cycle is the low-speed state S1. In a case where the driving assistance ECU 10 determines that a traveling state is the low-speed state S1, the driving assistance ECU 10 initializes a second time t2 (which will be described later) and also sets a value of the flag X to 1. The driving assistance ECU 10 stores the traveling state, the second time t2 (that is, 0), and the value of the flag X in the RAM of the driving assistance ECU 10.

In a case where the driving assistance ECU 10 determines that a traveling state is the low-speed state S1, the driving assistance ECU 10 determines whether or not a driving state of the vehicle 100 satisfies the following condition C1. The condition C1 is established when the following conditions 1 to 4 are all established.

(Condition 1) A shift position is not the P range.
(Condition 2) The brake switch 15 is in an OFF state.
(Condition 3) The EPB switch 16 is in an OFF state.
(Condition 4) The vehicle speed SPDv(n) is equal to or more than a starting vehicle speed threshold value SPDvath (a second vehicle speed threshold value; in this example, 5 km/h).

A case where the condition C1 is established is a case where the shift lever is moved to another range (typically, a D range or an ECO range) from the P range, the brake pedal is not pressed with the foot, the EPB switch 16 is turned off, and the vehicle speed SPDv(n) is equal to or more than 5 km/h (in other words, a case where the driver is estimated to have the intention of starting the vehicle 100). Thus, in a case where the driving assistance ECU 10 determines that the condition C1 is established, the driving assistance ECU 10 determines that a traveling state has transitioned to the starting state S2 from the low-speed state S1. In a case where the driving assistance ECU 10 determines that a traveling state has transitioned to the starting state S2, the driving assistance ECU 10 begins to measure the second time t2 that is a "time period in which a traveling state is the starting state S2". Since the starting state S2 immediately has transitioned to the low-speed state S1 when the condition C2 which will be described later is established, the driving assistance ECU 10 maintains a value of the flag X to be 1 (does not change the value thereof) even in a case where the driving assistance ECU 10 determines that a traveling state has transitioned to the starting state S2. The driving assistance ECU 10 stores the traveling state and the second time t2 in the RAM of the driving assistance ECU 10.

In contrast, a case where the condition C1 is not established is a case where at least one of the above-described conditions 1 to 4 is not established. That is, for example, the case is the following cases.

A case where the shift lever is in the P range (in other words, a case where the driver is estimated to have the intention of parking (maintaining a standstill of) the vehicle 100)

A case where the EPB switch 16 is turned on (in other words, a case where the driver is estimated to have the intention of parking (maintaining a standstill of) the vehicle 100)

A case where the shift lever is in ranges (typically, the D range or the ECO range) other than the P range, the EPB switch 16 is turned off, but the brake pedal is pressed with the foot (in other words, a case where the driver is estimated to have the intention of decelerating the vehicle 100)

A case where the shift lever is in ranges other than the P range, the brake pedal is not pressed with the foot, the EPB switch 16 is turned off, but the vehicle speed SPDv(n) is less than 5 km/h (in other words, a case where the driver is estimated to have the intention of starting the vehicle 100, but the vehicle speed SPDv(n) does not reach 5 km/h)

Thus, in a case where the driving assistance ECU 10 determines that the condition C1 is not established, the driving assistance ECU 10 determines that a traveling state is maintained to be the low-speed state S1. In this case, the driving assistance ECU 10 maintains a value of the flag X to be 1 (does not change the value thereof). Initialization of the second time t2 is not also performed. In other words, the driving assistance ECU initializes the second time t2 solely at a time point at which the driving assistance ECU 10 determines that a traveling state has transitioned to the low-speed state S1 from states (that is, the starting state S2 or the low-speed transition state S4) other than the low-speed state S1. The driving assistance ECU 10 stores the traveling state in the RAM of the driving assistance ECU 10.

In a case where the driving assistance ECU 10 determines that a traveling state is the starting state S2, the driving assistance ECU 10 determines whether or not a driving state of the vehicle 100 satisfies the following condition C2. The condition C2 is established in a case where at least one of the following conditions 5 and 6 is established.

(Condition 5) The brake switch 15 is in an ON state.
(Condition 6) The EPB switch 16 is in an ON state.
A case where the condition C2 is established is, for example, as follows.

A case where the brake pedal is pressed with the foot
A case where the EPB switch 16 is turned on
In other words, either case is a case where the driver is estimated to have the intention of stopping starting of the vehicle 100 and thus decelerating the vehicle 100.

Thus, in a case where the driving assistance ECU 10 determines that the condition C2 is established, the driving assistance ECU 10 determines that a traveling state has transitioned to the low-speed state S1 from the starting state S2. In this case, since the starting state S2 does not last, the driving assistance ECU 10 initializes the second time t2 (that is, the time period in which a traveling state is the starting state S2). On the other hand, the driving assistance ECU 10 maintains a value of the flag X to be 1 (does not change the value thereof). The driving assistance ECU 10 stores the traveling state and the second time t2 (that is, 0) in the RAM of the driving assistance ECU 10.

In contrast, a case where the condition C2 is not established is a case where neither of the above-described conditions 5 and 6 is not established. In other words, the case is a case where the brake pedal is not pressed with the foot, and the EPB switch 16 is turned off. In other words, the case is a case where the driver is estimated to have the intention of maintaining the starting state of the vehicle 100. In a case where the driving assistance ECU 10 determines that the condition C2 is not established, the driving assistance ECU 10 determines whether or not a driving state of the vehicle 100 satisfies the following condition C3. The condition C3 is established in a case where the following condition 7 is established.

(Condition 7) The second time t2 is equal to or more than a predetermined second time threshold value t2*th*.

A case where the condition C3 is established is a case where a traveling state transitions to the starting state S2 from the low-speed state S1 (that is, measurement of the second time t2 is begun), and then a time period (second time t2) in which the starting state S2 lasts is equal to or more than the second time threshold value t2*th* without transition to the low-speed state S1 at all (that is, without establishment of the condition C2). In other words, the case is a case where the driver is estimated to have the intention of starting the vehicle 100 for the second time threshold value t2*th* or more. Thus, in a case where the driving assistance ECU 10 determines that the condition C3 is established, the driving assistance ECU 10 determines that a traveling state has transitioned to the advancing state S3 from the starting state S2. In this case, the driving assistance ECU 10 initializes a first time t1 (which will be described later). The driving assistance ECU 10 determines that "the vehicle 100 advances without being positively decelerated (that is, without the braking force being applied through an operation of the user on the brake pedal or the electric parking brake)" at this time point, and sets a value of the flag X to 0 (changes the value thereof). The driving assistance ECU 10 continuously measures the second time t2. The driving assistance ECU 10 stores the traveling state, the first time t1 (that is, 0), the second time t2, and the value of the flag X in the RAM of the driving assistance ECU 10.

In contrast, a case where the condition C3 is not established is a case where the driver is estimated to have the intention of continuously starting the vehicle 100, but the second time t2 that is the duration of the starting state S2 does not reach the second time threshold value t2*th* yet. Thus, in a case where the driving assistance ECU 10 determines that the condition C3 is not established, the driving assistance ECU 10 determines that a traveling state is maintained to be the starting state S2. In this case, the driving assistance ECU 10 maintains a value of the flag X to be 1 (does not change the value thereof). Measurement of the second time t2 is not also begun (in other words, the second time t2 is continuously measured). In other words, the driving assistance ECU 10 begins to measure the second time t2 solely at a time point at which the driving assistance ECU 10 determines that a traveling state has transitioned to the starting state S2 from states (that is, the low-speed state S1) other than the starting state S2. The driving assistance ECU 10 stores the traveling state and the second time t2 in the RAM of the driving assistance ECU 10.

In a case where the driving assistance ECU 10 determines that a traveling state is the advancing state S3, the driving assistance ECU 10 determines whether or not a driving state of the vehicle 100 satisfies the following condition C4. The condition C4 is established in a case where at least one of the above-described conditions 5 and 6 (described below again) is established, and the following condition 8 is established. A low-speed transition vehicle speed threshold value SPDvdth in the condition 8 is set to be smaller than a starting vehicle speed threshold value SPDvath.

(Condition 5) The brake switch 15 is in an ON state.
(Condition 6) The EPB switch 16 is in an ON state.
(Condition 8) The vehicle speed SPDv(n) is equal to or less than the low-speed transition vehicle speed threshold value SPDvdth (a first vehicle speed threshold value; in this example, 3 km/h).

A case where the condition C4 is established is, for example, as follows.

A case where the brake pedal is pressed with the foot, and, as a result, the vehicle speed SPDv(n) is equal to or less than 3 km/h A case where the EPB switch 16 is turned on, and, as a result, vehicle speed SPDv(n) is equal to or less than 3 km/h In other words, either case is a case where the driver is estimated to have the intention of decelerating the vehicle 100.

Thus, in a case where the driving assistance ECU 10 determines that the condition C4 is established, the driving assistance ECU 10 determines that a traveling state has transitioned to the low-speed transition state S4 from the advancing state S3. In a case where the driving assistance ECU 10 determines that a traveling state has transitioned to the low-speed transition state S4, the driving assistance ECU 10 begins to measure the first time t1 that is a "time period in which a traveling state is the low-speed transition state S4". Since the low-speed transition state S4 immediately transitions to the advancing state S3 when the condition C5 which will be described later is established, the driving assistance ECU 10 maintains a value of the flag X to be 0 (does not change the value thereof) even in a case where the driving assistance ECU 10 determines that a traveling state has transitioned to the low-speed transition state S4. The driving assistance ECU 10 continuously measures the second time t2. The driving assistance ECU 10 stores the traveling state, the first time t1, and the second time t2 in the RAM of the driving assistance ECU 10.

In contrast, a case where the condition C4 is not established corresponds to any one of a case where none of the above condition 5, condition 6, and the condition 8 are established, a case where at least one of the above condition 5 and condition 6 is established, but the above condition 8 is not established, and a case where the above condition 8 is established, but neither of the above condition 5 and condition 6 is established. That is, for example, the case is the following cases.

A case where the brake pedal is not pressed with the foot, the EPB switch 16 is turned off, and the vehicle speed SPDv(n) is more than 3 km/h (in other words, the driver is estimated to have the intention of continuously causing the vehicle 100 to advance)

A case where the brake pedal is pressed with the foot, but the vehicle speed SPDv(n) is more than 3 km/h (in other words, the driver is estimated to have the intention of decelerating the vehicle 100, but the vehicle speed SPDv(n) is not reduced to 3 km/h yet)

Thus, in a case where the driving assistance ECU 10 determines that the condition C4 is not established, the driving assistance ECU 10 determines that a traveling state is maintained to be the advancing state S3. In this case, the driving assistance ECU 10 maintains a value of the flag X to be 0 (does not change the value thereof). Initialization of the first time t1 is not also performed. In other words, the driving assistance ECU initializes the first time t1 solely at a time point at which the driving assistance ECU 10 determines that a traveling state has transitioned to the advancing state S3 from states (that is, the starting state S2 or the low-speed transition state S4) other than the advancing state S3. The driving assistance ECU 10 continuously measures the second time t2. The driving assistance ECU 10 stores the traveling state and the second time t2 in the RAM of the driving assistance ECU 10.

In a case where the driving assistance ECU 10 determines that a traveling state is the low-speed transition state S4, the driving assistance ECU 10 determines whether or not a driving state of the vehicle 100 satisfies the following condition C5. The condition C5 is established in a case where all of the above-described conditions 1 to 3 (described below again) are established.

(Condition 1) A shift position is not the P range.
(Condition 2) The brake switch 15 is in an OFF state.
(Condition 3) The EPB switch 16 is in an OFF state.

A case where the condition C5 is established is a case where the shift lever is in ranges (typically, a D range or an ECO range) other than the P range, the brake pedal is not pressed with the foot, and the EPB switch 16 is turned off. In other words, the case is a case where the driver is estimated to have the intention of ceasing to decelerate or stop the vehicle 100 and causing to the vehicle 100 to advance. Thus, in a case where the driving assistance ECU 10 determines that the condition C5 is established, the driving assistance ECU 10 determines that a traveling state has transitioned to the advancing state S3 from the low-speed transition state S4. In this case, since the low-speed transition state S4 is not maintained, the driving assistance ECU 10 initializes the first time t1 (that is, a time period in which a traveling state is the low-speed transition state S4). The driving assistance ECU 10 maintains a value of the flag X to be 0 (does not change the value thereof). The driving assistance ECU 10 continuously measures the second time t2. The driving assistance ECU 10 stores the traveling state, the first time t1 (that is, 0), and the second time t2 in the RAM of the driving assistance ECU 10.

In contrast, a case where the condition C5 is not established is a case where at least one of the above conditions 1 to 3 is not established. That is, for example, the case is the following cases.

A case where the shift lever is in the P range (in other words, a case where the driver is estimated to have the intention of parking (maintaining a standstill of) the vehicle 100)

A case where the EPB switch 16 is turned on (in other words, a case where the driver is estimated to have the intention of parking (maintaining a standstill of) the vehicle 100)

A case where the shift lever is in ranges (typically, the D range or the ECO range) other than the P range, the EPB switch 16 is turned off, but the brake pedal is pressed with the foot (in other words, a case where the driver is estimated to have the intention of decelerating the vehicle 100)

Thus, in a case where the driving assistance ECU 10 determines that the condition C5 is not established, the driving assistance ECU 10 determines whether or not a driving state of the vehicle 100 satisfies the following condition C6. The condition C6 is established in a case where the following condition 9 is established.

(Condition 9) The first time t1 is equal to or more than a predetermined first time threshold value t1$th$.

A case where the condition C6 is established is a case where a traveling state transitions to the low-speed transition state S4 from the advancing state S3 (that is, measurement of the first time t1 is begun), and then a time period (first time t1) in which the low-speed transition state S4 lasts is equal to or more than the first time threshold value t1$th$ without transition to the advancing state S3 at all (that is, without establishment of the condition C5). In other words, the case is a case where the driver is estimated to have the intention of decelerating or stopping the vehicle 100 for the first time threshold value t1$th$ or more.

Thus, in a case where the driving assistance ECU 10 determines that the condition C6 is established, the driving assistance ECU 10 determines that a traveling state has transitioned to the low-speed state S1 from the low-speed transition state S4. In a case where the driving assistance ECU 10 determines that a traveling state has transitioned to the low-speed state S1 from the low-speed transition state S4, the driving assistance ECU 10 initializes the second time t2 that is being measured after a traveling state transitions to the starting state S2. The driving assistance ECU 10 determines that "the vehicle 100 travels at the vehicle speed SPDv(n) of the low-speed transition vehicle speed threshold value SPDvdth or less (including the vehicle speed SPDv(n)=0)" at this time point, and sets a value of the flag X to 1 (changes the value thereof). The driving assistance ECU 10 continuously measures the first time t1. The driving assistance ECU 10 stores the traveling state, the first time t1, the second time t2 (that is, 0), and the value of the flag X in the RAM of the driving assistance ECU 10. The first time t1 is continuously measured until the driving assistance ECU 10 determines that a traveling state has transitioned to the advancing state S3 through the low-speed state S1 and the starting state S2.

In contrast, a case where the condition C6 is not established is a case where the driver is estimated to have the intention of continuously decelerating or stopping the vehicle 100, but the first time t1 that is the duration of the low-speed transition state S4 does not reach the first time threshold value t1$th$ yet. Thus, in a case where the driving assistance ECU 10 determines that the condition C6 is not established, the driving assistance ECU 10 determines that a traveling state is maintained to be the low-speed transition state S4. In this case, the driving assistance ECU 10 maintains a value of the flag X to be 0 (does not change the value thereof). Measurement of the first time t1 is not also begun (in other words, the first time t1 is continuously measured). In other words, the driving assistance ECU 10 begins to measure the first time t1 solely at a time point at which the driving assistance ECU 10 determines that a traveling state has transitioned to the low-speed transition state S4 from states (that is, the advancing state S3) other than the low-speed transition state S4. The driving assistance ECU 10 continuously measures the second time t2. The driving assistance ECU 10 stores the traveling state, the first time t1, and the second time t2 in the RAM of the driving assistance ECU 10.

As is clear from the above description, in a case where the driving assistance ECU 10 determines that a traveling state is the low-speed state S1 or the starting state S2, a value of the flag X is set (maintained) to 1, and, in a case where the driving assistance ECU 10 determines that a traveling state is the advancing state S3 or the low-speed transition state S4, a value of the flag X is set (maintained) to 0.

C. Operation Regarding Warning Determination

Next, a description will be made of an operation regarding the warning determination with reference to FIGS. 3 to 6. First, a description will be made of a summary of the warning determination. The present embodiment apparatus performs the following operation whenever the calculation time Tcal elapses during the engine ON period. In other words, the present embodiment apparatus sets coordinate axes having the present position of the vehicle 100 as the origin based on host vehicle information. The present embodiment apparatus determines whether or not there is a target on the periphery of the vehicle 100, and acquires target information regarding the target in a case where the present embodiment apparatus determines that the target is present. The present embodiment apparatus estimates an expected route of the vehicle 100 based on the host vehicle information, and also estimates an expected route of the target based on the target information, so as to determine whether or not there is a target (objective target) that may probably cross the expected route of the vehicle 100 within a threshold time. The expected route is estimated in a case where the present embodiment apparatus determines that the vehicle 100 advances straight (including the vehicle speed SPDv(n)=0). Thus, the present embodiment apparatus estimates a linear route having a predetermined length (here, variable) as the expected route.

The present embodiment apparatus uses a determination result (that is, a value of the flag X) in the traveling state determination described in the above B when the present embodiment apparatus determines whether or not there is an objective target. In other words, in a case where a value of the flag X is 0, the present embodiment apparatus sets a length of the expected route to the first length, and, in a case where a value of the flag X is 1, the present embodiment apparatus sets a length of the expected route to the second length smaller than the first length. The present embodiment apparatus determines a "target that may probably cross the expected route having the set length within a threshold time" as being an objective target. In a case where the present embodiment apparatus determines that the objective target is present, the present embodiment apparatus gives a warning of the objective target, and, in a case where the present embodiment apparatus determines that the objective target is not present, the present embodiment apparatus does not give a warning. Hereinafter, a warning determination method will be described in detail.

Setting of Coordinate Axes

Figure 3:
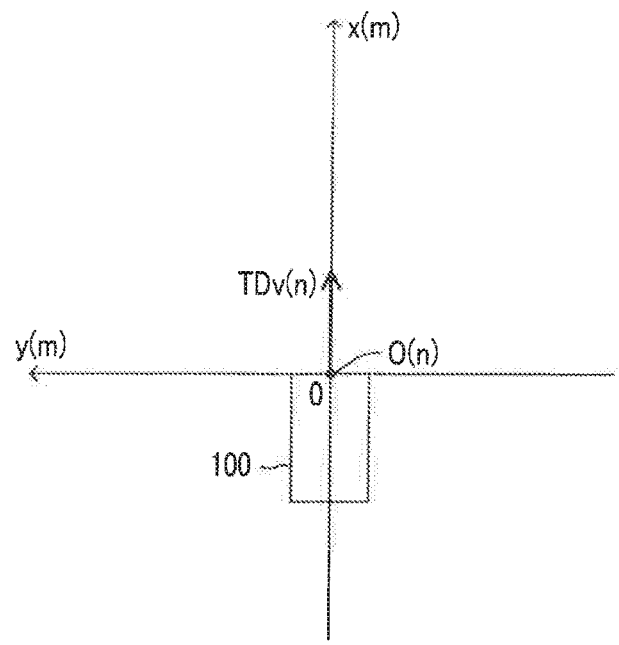
FIG. 3 is a diagram illustrating coordinate axes set in the periphery of the host vehicle in an n-th cycle by the present embodiment apparatus.

The driving assistance ECU 10 sets coordinate axes having the present position of the vehicle 100 as the origin based on host vehicle information. Specifically, as illustrated in FIG. 3, the driving assistance ECU 10 sets the center of the front end portion of the vehicle 100 in the n-th cycle as the origin O(n) (0,0), sets an x axis along an advancing direction TDv(n) of the vehicle 100 in the n-th cycle, and sets a y axis in a direction orthogonal to the advancing direction TDv(n) through the origin O(n). The x axis has the advancing direction TDv(n) as a positive direction, and the y axis has a leftward direction of the vehicle 100 as a positive direction. The advancing direction TDv(n) is calculated based on the vehicle speed SPDv(n) and the yaw rate Y(n) in the n-th cycle. The advancing direction TDv(n) may be calculated based on the wheel speed WS(n) and a turning radius R(n) (that is, a value calculated based on the vehicle speed SPDv(n) and the yaw rate Y(n)) in the n-th cycle. The driving assistance ECU 10 stores information indicating the coordinate axes in the RAM of the driving assistance ECU 10. The unit of each of an x component and a y component in an xy coordinate plane is [m].

Acquisition of Target Information

Figure 4:
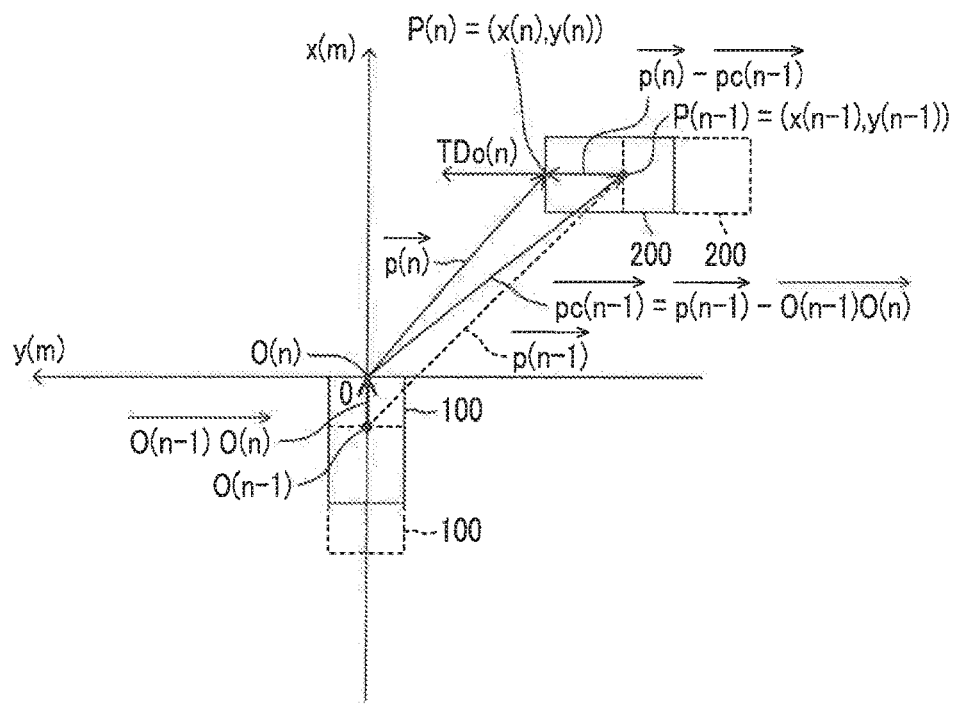
FIG. 4 is a diagram illustrating a positional relationship between the host vehicle and a target in an (n−1)-th cycle and the n-th cycle, and is a diagram illustrating acquisition of target information regarding the target in the n-th cycle.

The driving assistance ECU 10 determines whether or not a target is present on the periphery of the vehicle 100 based on a signal received from each radar sensor 17. In a case where the driving assistance ECU 10 determines that the target is present, the driving assistance ECU 10 acquires a distance from the vehicle 100 to the target and an azimuth of the target relative to the vehicle 100. The driving assistance ECU 10 calculates a coordinate (x(n),y(n)) of a relative position P(n) of the target in the n-th cycle for a position (that is, the origin O(n)) of the vehicle 100 in the n-th cycle based on the distance and the azimuth of the target in the n-th cycle. As illustrated in FIG. 4, the driving assistance ECU 10 calculates an advancing direction TDo(n) and a speed SPDo(n) [km/h] of a target 200 that is an example of the target in the n-th cycle according to the following procedures. In FIG. 4, the vehicle 100 and the target 200 in the n-th cycle are indicated by solid lines, and the vehicle 100 and the target 200 in the (n−1)-th cycle are indicated by dashed lines.

Calculation of Advancing Direction TDo of Target

First, the driving assistance ECU 10 calculates a position vector p(n) of a relative position P(n) of the target 200 in the n-th cycle and a position vector p(n−1) of a relative position P(n−1) of the target 200 in the (n−1)-th cycle according to the following Equations (1), (2).

$$p(n)=(x(n),y(n)) \tag{1}$$

$$p(n-1)=(x(n-1),y(n-1)) \tag{2}$$

As is clear from the above Equations (1), (2), components of the position vector p(n) are the same as coordinates of the relative position P(n) of the target 200 in the n-th cycle, and components of the position vector p(n−1) are the same as coordinates of the relative position P(n−1) of the target 200 in the (n−1)-th cycle. In other words, the position vector p(n) is a vector having the origin O(n) in the n-th cycle as a starting point, the position vector p(n−1) is a vector having the origin O(n−1) as a starting point, and thus both of the vectors have different starting points. Therefore, the driving assistance ECU 10 converts the position vector p(n−1) into a position vector pc(n−1) having the origin O(n) in the n-th cycle as a starting point according to the following Equation (3).

$$pc(n-1)=p(n-1)-O(n-1)O(n) \tag{3}$$

Here, the vector O(n−1)O(n) is a vector from the origin O(n−1) in the (n−1)-th cycle to the origin O(n) in the n-th cycle. The vector O(n−1)O(n) is a vector having, as the magnitude thereof, a value obtained by multiplying the vehicle speed SPDv(n−1) of the vehicle 100 in the (n−1)-th cycle by the calculation time Tcal, and having the advancing direction TDv(n−1) in the (n−1)-th cycle as a direction thereof.

The driving assistance ECU 10 subtracts Equation (3) from Equation (1) according to the following Equation (4), so as to calculate a displacement direction of the target 200 from the (n−1)-th cycle to the n-th cycle.

$$p(n)-pc(n-1)=p(n)-p(n-1)+O(n-1)O(n) \tag{4}$$

The driving assistance ECU 10 calculates the displacement direction of the target expressed by Equation (4) as the advancing direction TDo(n) of the target 200 in the n-th cycle.

Calculation of Speed SPDo of Target

Next, the driving assistance ECU 10 calculates the speed SPDo(n) of the target 200 in the n-th cycle according to the following Equation (5). Here, abs{X} indicates the magnitude of a vector X.

$$SPDo(n)=abs\{p(n)-p(n-1)+O(n-1)O(n)\}/Tcal \tag{5}$$

In other words, the driving assistance ECU 10 calculates, as the speed SPDo(n) of the target 200 in the n-th cycle, a value obtained by dividing a displacement amount (abs{p(n)−p(n−1)+O(n−1)O(n)}) of the target 200 from the (n−1)-th cycle to the n-th cycle by the calculation time Tcal. The driving assistance ECU 10 stores the coordinates of the relative position P(n) of the target, the advancing direction TDo(n) of the target, and the speed SPDo(n) of the target in the RAM of the driving assistance ECU 10 as target information. In a case where the respective radar sensors 17 output signals reflected by the same target to the driving assistance ECU 10, the driving assistance ECU 10 acquires target information regarding the same target based on the signals.

Estimation of Right Expected Route and Left Expected Route of Vehicle 100

Figure 5:
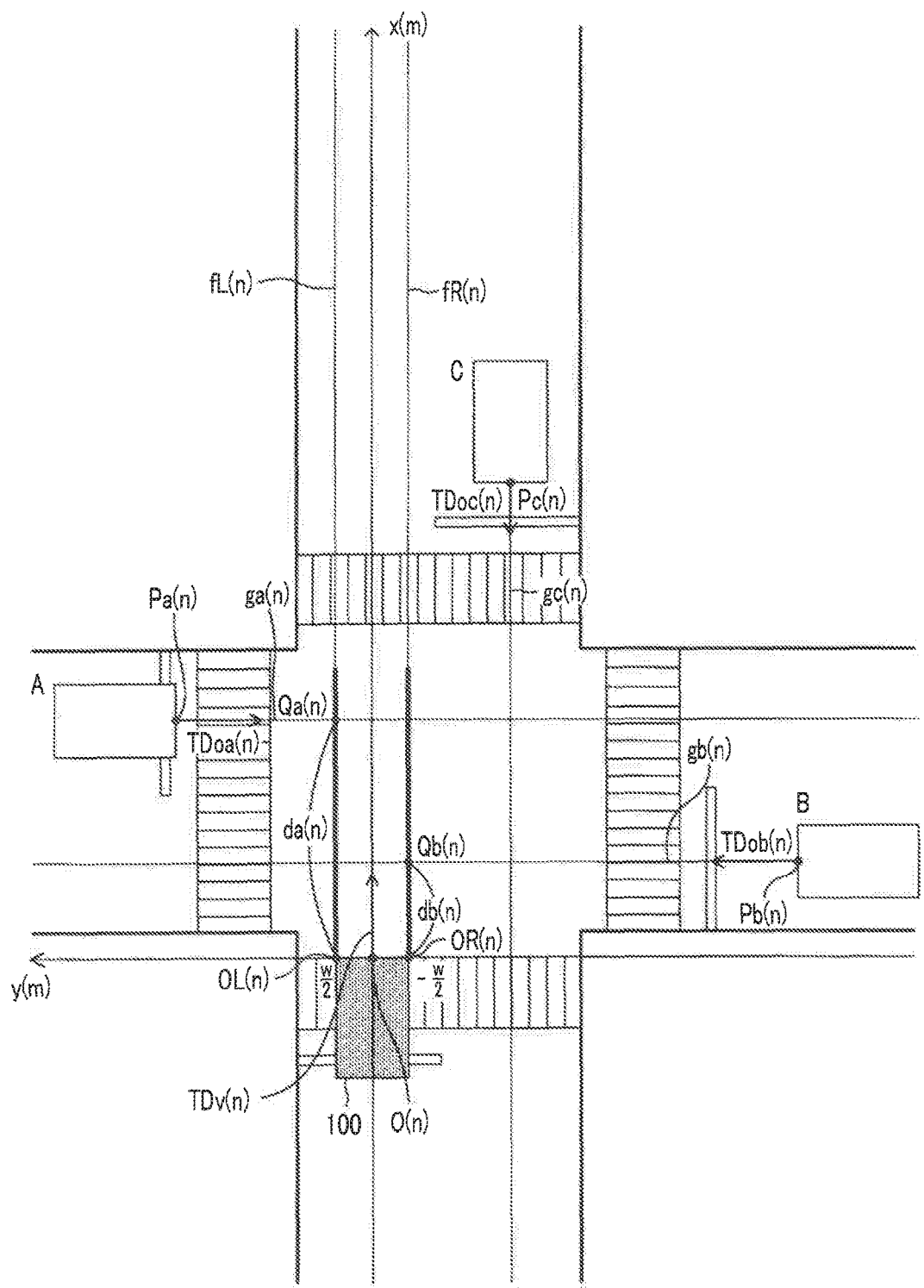
FIG. 5 is a diagram illustrating a positional relationship between the host vehicle and a target present on the periphery of the host vehicle in the n-th cycle on a road, and is a diagram illustrating the presence or absence of an objective target in a case where a traveling state of the host vehicle is determined as being an advancing state.
Figure 6:
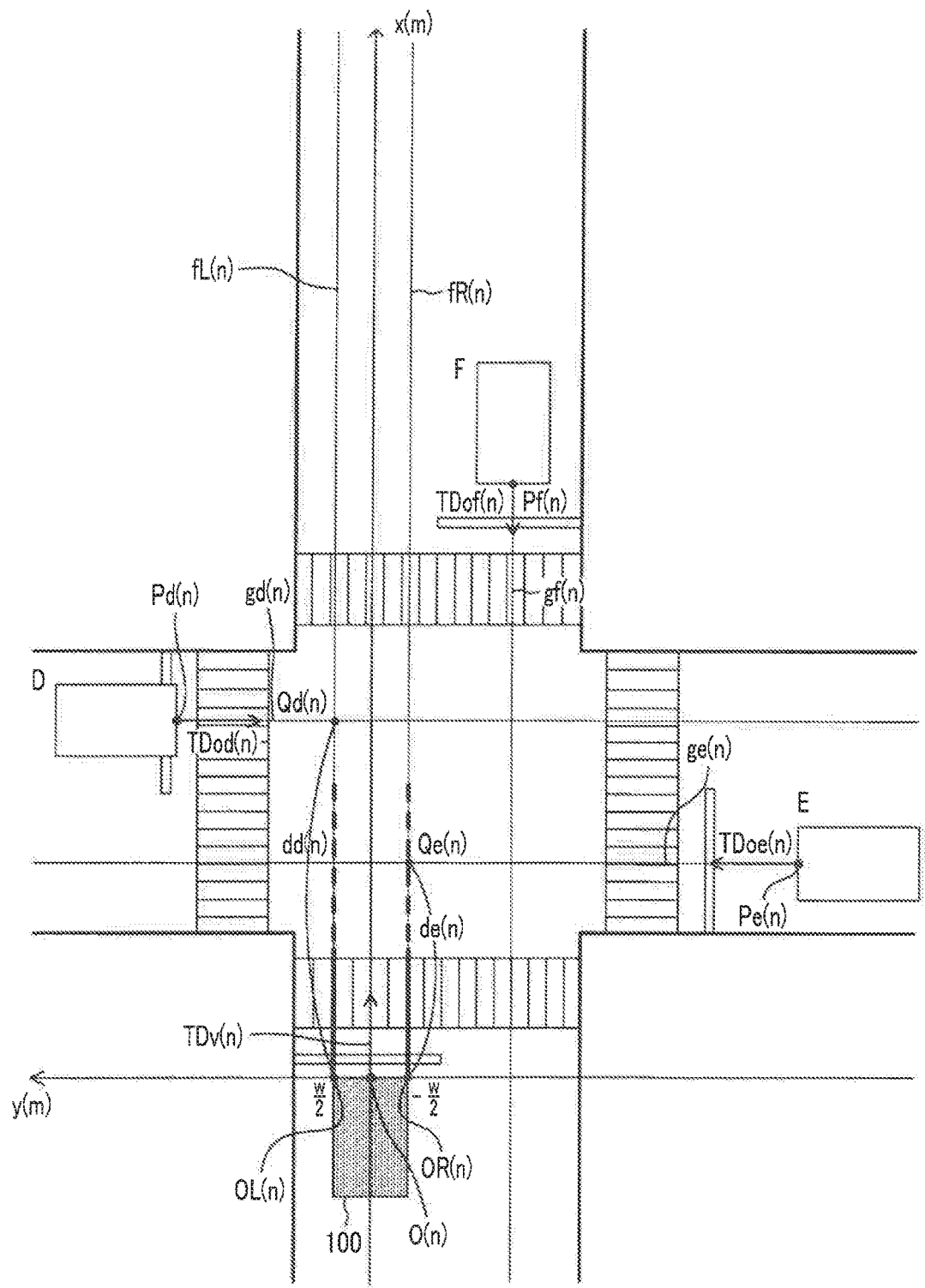
FIG. 6 is a diagram illustrating a positional relationship between the host vehicle and a target present on the periphery of the host vehicle in the n-th cycle on a road, and is a diagram illustrating the presence or absence of an objective target in a case where a traveling state of the host vehicle is determined as being a low-speed state.

The driving assistance ECU 10 estimates an expected route (left expected route) that a left end OL(n) (refer to FIGS. 5, 6) of the front end portion of the vehicle 100 is expected to pass and an expected route (right expected route) that a right end OR(n) (refer to FIGS. 5, 6) of the front end portion of the vehicle 100 is expected to pass. FIG. 5 illustrates a state in which a traffic signal (not illustrated) on a road side on which the vehicle 100 is located is lighted blue, and the vehicle 100 is traveling on the road at a normal speed for the second time threshold value or more. FIG. 6 illustrates a state in which the traffic signal (not illustrated) on the road side on which the vehicle 100 is located is lighted red, and the vehicle 100 is stopped in front of a stop line of an intersection for the first time threshold value or more. According to the traveling state determination method in the above B, a traveling state of the vehicle 100 in FIG. 5 is the advancing state S3 (that is, a value of the flag X is 0), and a traveling state of the vehicle 100 in FIG. 6 is the low-speed state S1 (that is, a value of the flag X is 1). When the driving assistance ECU 10 estimates the right and left expected routes, first, the driving assistance ECU 10 calculates a left expected route expression fL(n) and a right expected route expression fR(n) according to the following Equations (6). Here, w indicates a width of the vehicle 100 (a length of the vehicle 100 in its y axis direction). In addition, w is set in advance for each vehicle on which the driving assistance ECU 10 is scheduled to be mounted.

Left expected route expression $fL(n)$: $y=w/2$ $(x \geq 0)$ (6)

Right expected route expression $fR(n)$: $y=-w/2$ $(x \geq 0)$ (7)

In other words, the driving assistance ECU 10 calculates an expression of a half straight line extending in the advancing direction TDv(n) of the vehicle 100 from the left end OL(n) of the vehicle 100 as the left expected route expression fL(n). The driving assistance ECU 10 calculates an expression of a half straight line extending in the advancing direction TDv(n) of the vehicle 100 from the right end OR(n) of the vehicle 100 as the right expected route expression fR(n). The driving assistance ECU 10 stores the respective expected route expressions fR(n), fL(n) in the RAM of the driving assistance ECU 10.

The driving assistance ECU 10 calculates a portion (that is, a range of $0 \leq x(n) \leq 7$) ranging over a first length (first length; in this example, 7 m; and refer to a thick solid line in FIG. 5 and a thick dashed line in FIG. 6) from the vehicle 100 in a straight line expressed by the left expected route expression fL(n) as the left expected route in the n-th cycle in the xy coordinate plane. The driving assistance ECU 10 calculates a portion (that is, a range of $0 \leq x(n) \leq 7$) ranging over the first length (first length; in this example, 7 m; and refer to a thick solid line in FIG. 5 and a thick dashed line in FIG. 6) from the vehicle 100 in a straight line expressed by the right expected route expression fR(n) as the right expected route in the n-th cycle in the xy coordinate plane. The first length is a length set through examination of the present inventors, and is a length that is determined to be optimal as a length of an expected route in a case where the vehicle 100 is traveling on a road at a normal speed. In other words, when the right and left expected routes are estimated, the driving assistance ECU 10 sets the length to the first length regardless of a traveling state (that is, a value of the flag X) of the vehicle 100.

Estimation of Expected Route of Target

The driving assistance ECU 10 estimates an expected route that a target passes based on target information. The driving assistance ECU 10 calculates an expression of a half straight line extending in the advancing direction TDo(n) of the target from the relative position P(n) of the target as an expected route expression g(n) expressing an expected route of the target in the n-th cycle in the xy coordinate plane. Objects A to C illustrated in FIG. 5 and Objects D to F illustrated in FIG. 6 are objects (that is, targets) present within an arrival range of electric waves transmitted from the respective radar sensors 17 of the vehicle 100 in the n-th cycle. In the examples illustrated in FIGS. 5 and 6, the driving assistance ECU 10 calculates an expected route expression ga(n) to an expected route expression gf(n) respectively extending in an advancing direction TDoa(n) to an advancing direction TDof(n) (refer to arrows in FIGS. 5 and 6) from a relative position Pa(n) to a relative position Pf(n) of the target A to the target F based on target information in the n-th cycle (hereinafter, the expected route expression g(n) will be simply referred to as an "expression g(n)" in some cases). The driving assistance ECU 10 stores the expression ga(n) to the expression gf(n) in the RAM of the driving assistance ECU 10.

Calculation of Crossing Condition and Coordinates of Crossing Point Q

The driving assistance ECU 10 determines whether or not a crossing condition is established in which a straight line expressed by the expression g(n) (in the examples illustrated in FIGS. 5 and 6, each of the expression ga(n) to the expression gf(n)) of the target crosses both of a straight line expressed by the left expected route expression fL(n) of the vehicle 100 and a straight line expressed by the right expected route expression fR(n) thereof. In a case where the driving assistance ECU 10 determines that the crossing condition is established, the driving assistance ECU 10 extracts the target as a target satisfying the crossing condition. The driving assistance ECU 10 calculates a coordinates of a crossing point Q(n) with a straight line first crossed by the straight line expressed by the expression g(n) for the extracted target, of the straight lines respectively expressed by the left expected route expression fL(n) and the right expected route expression fR(n). On the other hand, in a case where the driving assistance ECU 10 determines that the crossing condition is not established, the driving assistance ECU 10 does not extract the target. The driving assistance ECU 10 stores the extraction result and a coordinate of the crossing point Q(n) in the RAM of the driving assistance ECU 10 in correlation with the target. As is clear from the above description, in a case where the straight line expressed by the expression g(n) for a target crosses solely one of the two straight lines (that is, the relative position P(n) of a target having the advancing direction TDo(n) crossing the advancing direction TDv(n) of the vehicle 100 is located between the two straight lines), the crossing condition is not established.

In the example illustrated in FIG. 5, a straight line expressed by the expression ga(n) for the target A crosses both of the straight lines expressed by the left expected route expression fL(n) and the right expected route expression fR(n) for the vehicle 100, and first crosses the straight line expressed by the left expected route expression fL(n) at a point Qa(n) of both of the straight lines. A straight line expressed by the expression gb(n) for the target B crosses both of the straight lines expressed by the left expected route expression fL(n) and the right expected route expression fR(n), and first crosses the straight line expressed by the right expected route expression fR(n) at a point Qb(n) of both of the straight lines. Thus, the driving assistance ECU 10 determines that the crossing condition is established with respect to the target A and the target B, and extracts the target A and the target B as targets satisfying the crossing condition. The driving assistance ECU 10 calculates a coordinate of the crossing point Qa(n) with respect to the target A, and calculates a coordinate of the crossing point Qb(n) with respect to the target B. On the other hand, a straight line expressed by the expression gc(n) for the target C does not cross either of the straight lines respectively expressed by the left expected route expression fL(n) and the right expected route expression fR(n). Thus, the driving assistance ECU 10 determines that the crossing condition is not established with respect to the target C, and thus does not extract the target C.

In the example illustrated in FIG. 6, a straight line expressed by the expression gd(n) for the target D crosses both of the straight lines expressed by the left expected route expression fL(n) and the right expected route expression fR(n) for the vehicle 100, and first crosses the straight line expressed by the left expected route expression fL(n) at a point Qd(n) of both of the straight lines. A straight line expressed by the expression ge(n) for the target E crosses both of the straight lines expressed by the left expected route expression fL(n) and the right expected route expression fR(n), and first crosses the straight line expressed by the right expected route expression fR(n) at a point Qe(n) of both of the straight lines. Thus, the driving assistance ECU 10 determines that the crossing condition is established with respect to the target D and the target E, and extracts the target D and the target E as targets satisfying the crossing condition. The driving assistance ECU 10 calculates a coordinate of the crossing point Qd(n) with respect to the target D, and calculates a coordinate of the crossing point Qe(n) with respect to the target E. On the other hand, a straight line expressed by the expression gf(n) for the target F does not cross either of the straight lines respectively expressed by the left expected route expression fL(n) and the right expected route expression fR(n). Thus, the driving assistance ECU 10 determines that the crossing condition is not established with respect to the target F, and thus does not extract the target F.

Calculation of Distance d and First Length Condition

In a case where the target is extracted as a target satisfying the crossing condition, the driving assistance ECU 10 calculates a distance d(n) [m] from the vehicle 100 to the crossing point Q(n) for the target. The driving assistance ECU 10 calculates a distance from the left end OL(n) of the vehicle 100 to the crossing point Q(n) as the distance d(n) in a case where the crossing point Q(n) is located on the left expected route, and calculates a distance from the right end OR(n) of the vehicle 100 to the crossing point Q(n) as the distance d(n) in a case where the crossing point Q(n) is located on the right expected route. The driving assistance ECU 10 stores the distance d(n) in the RAM of the driving assistance ECU 10 in correlation with the target. The driving assistance ECU 10 determines whether or not a first length condition is established in which the distance d(n) is equal to or less than the first length (in this example, 7 m) of each expected route of the vehicle 100. In other words, the driving assistance ECU 10 determines whether or not the first length condition is established with respect to all targets satisfying the crossing condition regardless of a traveling state (that is, a value of the flag X) of the vehicle 100. In a case where the driving assistance ECU 10 determines that the first length condition is established, the driving assistance ECU 10 extracts the target as a target satisfying the first length condition. On the other hand, in a case where the driving assistance ECU 10 determines that the first length condition is not established, the driving assistance ECU 10 does not extract the target. The driving assistance ECU 10 stores the extraction result in the RAM of the driving assistance ECU 10 in correlation with the target.

In the example illustrated in FIG. 5, of the target A and the target B extracted as targets satisfying the crossing condition, with respect to the target A, a distance da(n) from the left end OL(n) of the vehicle 100 to the crossing point Qa(n) is equal to or less than the length (refer to the thick solid line in FIG. 5) of the left expected route. With respect to the target B, a distance db(n) from the right end OR(n) of the vehicle 100 to the crossing point Qb(n) is equal to or less than the length (refer to the thick solid line in FIG. 5) of the right expected route. Thus, the driving assistance ECU 10 determines that both of the target A and the target B satisfy the first length condition, and extracts the targets as targets satisfying the first length condition.

In the example illustrated in FIG. 6, of the target D and the target E extracted as targets satisfying the crossing condition, with respect to the target E, a distance de(n) from the right end OR(n) of the vehicle 100 to the crossing point Qe(n) is equal to or less than the length (refer to the thick dashed line in FIG. 6) of the right expected route. Thus, the driving assistance ECU 10 determines that the first length condition is established with respect to the target E, and extracts the target E as a target satisfying the first length condition. On the other hand, with respect to the target D, a distance dd(n) from the left end OL(n) of the vehicle 100 to the crossing point Qd(n) exceeds the length (refer to the thick dashed line in FIG. 6) of the left expected route. Thus, the driving assistance ECU 10 determines that the first length condition is not established with respect to the target D, and thus does not extract the target D.

Calculation of Time t and Time Condition

In a case where the target is extracted as a target satisfying the first length condition, the driving assistance ECU 10 calculates time t(n) at which the target is expected to reach an expected route. The driving assistance ECU 10 calculates time t(n) by dividing a "length from the relative position P(n) of the target at the crossing point Q(n)" by the "speed SPDo(n) of the target". The driving assistance ECU 10 stores time t(n) in the RAM of the driving assistance ECU 10 in correlation with the target. The driving assistance ECU 10 determines that a time condition is established in which time t(n) is equal to or less than a threshold time (in this example, 4 seconds). In a case where the driving assistance ECU 10 determines that the time condition is established, the driving assistance ECU 10 extracts the target as a target satisfying the time condition. On the other hand, in a case where the driving assistance ECU 10 determines that the time condition is not established, the driving assistance ECU 10 does not extract the target. The driving assistance ECU 10 stores the extraction result in the RAM of the driving assistance ECU 10.

In the example illustrated in FIG. 5, the driving assistance ECU 10 calculates time ta(n) and time tb(n) with respect to the target A and the target B extracted as targets satisfying the first length condition. Time ta(n) is calculated by dividing the length from the relative position Pa(n) of the target A to the crossing point Qa(n) by the speed SPDoa(n) of the target A. Time tb(n) is calculated in the same method. For example, in a case where time ta(n) is 2 seconds, and time tb(n) is 3 seconds, both of time ta(n) and time tb(n) are equal to or less than the threshold time. Thus, the driving assistance ECU 10 determines that the time condition is established with respect to both of the target A and the target B, and extracts the targets as targets satisfying the time condition.

In the example illustrated in FIG. 6, the driving assistance ECU 10 calculates time te(n) with respect to the target E extracted as a target satisfying the first length condition. Time te(n) is calculated in the same method. For example, in a case where time te(n) is 3 seconds, te(n) is equal to or less than the threshold time. Thus, the driving assistance ECU 10 determines that the time condition is established with respect to the target E, and extracts the target E as a target satisfying the time condition.

Second Length Condition Based on Value of Flag X

In a case where the target is extracted as a target satisfying the time condition, the driving assistance ECU 10 determines whether or not a value of the flag X set in the traveling state determination described in the above B is 1. In a case where the driving assistance ECU 10 determines that a value of the flag X is 1 (that is, in a case where the driving assistance ECU 10 determines that a traveling state of the vehicle is the low-speed state S1 or the starting state S2), the driving assistance ECU 10 determines a state in which the vehicle 100 is not started at a low speed, or a state in which the vehicle 100 begins to be started (that is, in a state in which a probability of sudden forward advancing is lower), and sets (reduces) a length of the expected route to a second length (in this example, 3 m; refer to the thick solid line in FIG. 6) smaller than the first length. The driving assistance ECU 10 determines whether or not a second length condition is established in which the distance d(n) is equal to or less than the second length (in this example, 3 m) of each expected route of the vehicle 100 with respect to the target extracted as a target satisfying the time condition. In other words, in a case where a value of the flag X is 1, the driving assistance ECU 10 determines whether or not two length conditions such as the first length condition and the second length condition are established. In a case where the driving assistance ECU 10 determines that the second length condition is established, the driving assistance ECU 10 extracts the target as a "target satisfying the second length condition". On the other hand, in a case where the driving assistance ECU 10 determines that the second length condition is not established, the driving assistance ECU 10 does not extract the target. The driving assistance ECU 10 stores the extraction result in the RAM of the driving assistance ECU 10 in correlation with the target.

In contrast, in a case where the driving assistance ECU 10 determines that a value of the flag X is 0 (that is, in a case where the driving assistance ECU 10 determines that a traveling state of the vehicle is the advancing state S3 or the low-speed transition state S4), the driving assistance ECU 10 determines an advancing state or a state in which there is a higher probability that the vehicle 100 may return to an advancing state (that is, a state in which there is a probability that the vehicle may suddenly advance forward), and maintains a length of the expected route to be the first length. In other words, a determination on the second length condition is not performed.

The second length is a length set through examination of the present inventors, and is a length that is determined to be optimal as a length of an expected route in a case where the vehicle 100 is traveling on a road at a low speed. In the present embodiment apparatus, the second length is set to be smaller than a distance from a stop line to a crossing road (that is, a road crossing the road on which the vehicle 100 is traveling) via a cross-walk (refer to the thick solid line in FIG. 6) in a general intersection. The second length is not limited to 3 m, and may be, for example, any value from 3 m to 5 m.

In the example illustrated in FIG. 5, a traveling state of the vehicle 100 is the advancing state S3, and thus a value of the flag X is 0. Thus, the driving assistance ECU 10 maintains a length of the expected route to be the first length (the length indicated by the thick solid line in FIG. 5; in this example, 7 m), and does not perform a determination on the second length condition.

In the example illustrated in FIG. 6, a traveling state of the vehicle 100 is the low-speed state S1, and thus a value of the flag X is 1. Thus, the driving assistance ECU 10 sets (reduces) a length of each expected route to the second length (the length indicated by the thick solid line in FIG. 6; in this example, 3 m). The driving assistance ECU 10 determines whether or not the second length condition is established with respect to the target E extracted as a target satisfying the time condition. The distance de(n) for the target E exceeds the reduced length (the length indicated by the thick solid line in FIG. 6) of the right expected route. Thus, the driving assistance ECU 10 determines that the second length condition is not established with respect to the target E, and does not extract the target E.

Warning

In a case where a value of the flag X is 0 (that is, in a case where a traveling state is the advancing state S3 or the low-speed transition state S4), the driving assistance ECU 10 determines that the target extracted as a target satisfying the time condition is a "target (objective target) that that may probably cross the left expected route and/or the right expected route having the first length within a time threshold value", and gives a warning about the objective target. On the other hand, in a case where there is no target extracted as a target satisfying the crossing condition, the first length condition, or the time condition, the driving assistance ECU 10 determines that there is no objective target, and thus does not give a warning. In contrast, in a case where a value of the flag X is 1 (that is, in a case where a traveling state is the low-speed state S1 or the starting state S2), the driving assistance ECU 10 determines that the target extracted as a target satisfying the second length condition is a "target (objective target) that may probably cross the left expected route and/or the right expected route having the second length within a time threshold value", and gives a warning about the objective target. On the other hand, in a case where there is no target extracted as a target satisfying the crossing condition, the first length condition, the time condition, or the second length condition, the driving assistance ECU 10 determines that there is no objective target, and thus does not give a warning.

Specific Operation of Present Embodiment Apparatus

Next, a description will be made of a specific operation of the present embodiment apparatus. The CPU of the driving assistance ECU 10 of the present embodiment apparatus executes routines indicated by flowcharts illustrated in FIGS. 7 to 9 whenever the calculation time Tcal elapses during the engine ON period. The routines are executed in a case where the vehicle 100 is determined as being advancing straight. Whether or not the vehicle 100 is advancing straight may be determined based on, for example, a difference between the wheel speed WS(n) of a front left wheel and the wheel speed WS(n) of a front right wheel, the yaw rate Y(n), and either of a steering angle and lateral acceleration. Hereinafter, the CPU of the driving assistance ECU 10 will be simply referred to as a "CPU", and a routine executed by the CPU in the n-th cycle will be described.

Figure 7:
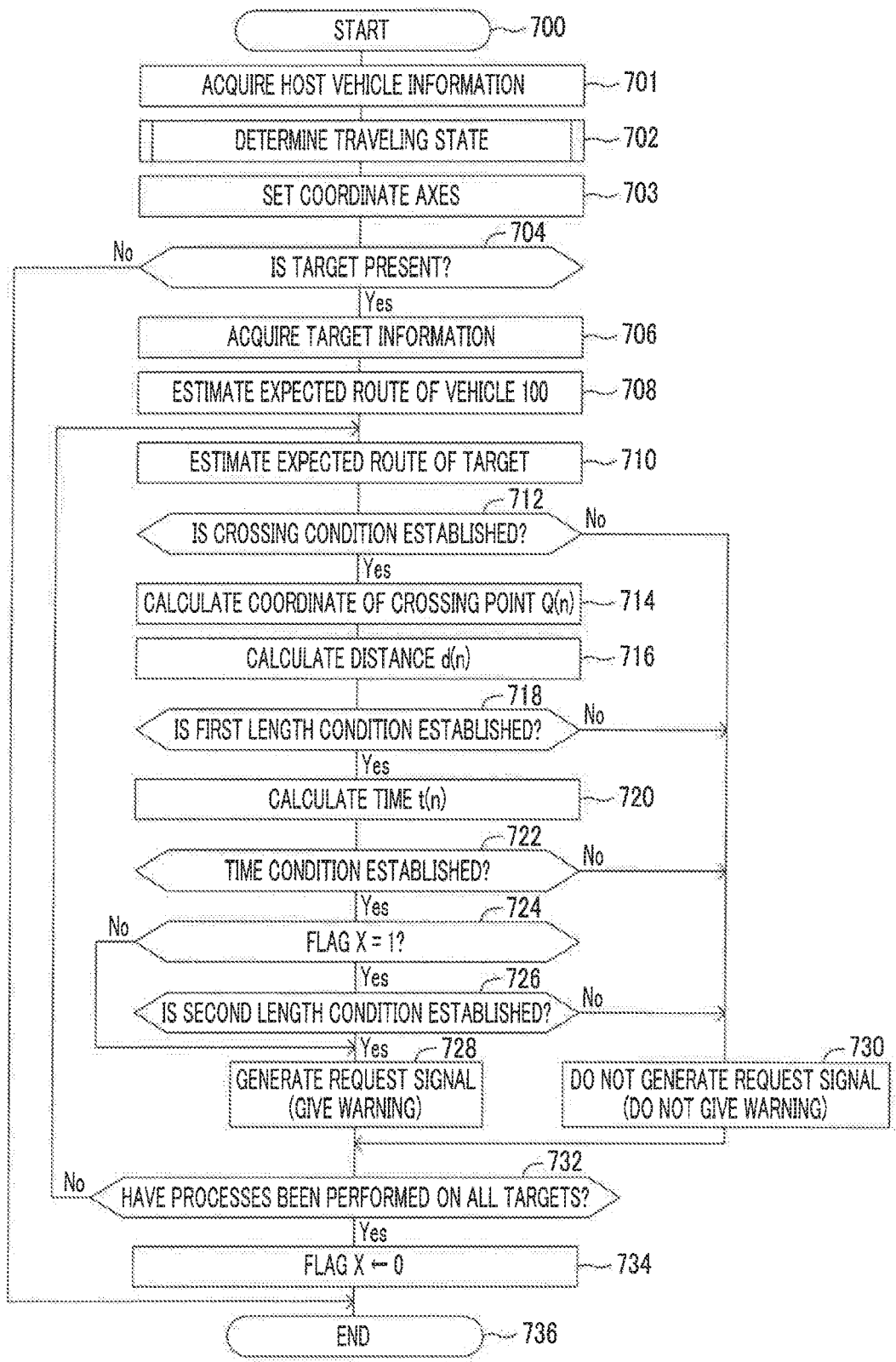
FIG. 7 is a flowchart (first) illustrating a routine executed by a CPU (hereinafter, referred to as a "CPU of the present embodiment apparatus") of a driving assistance ECU of the present embodiment apparatus.
Figure 8:
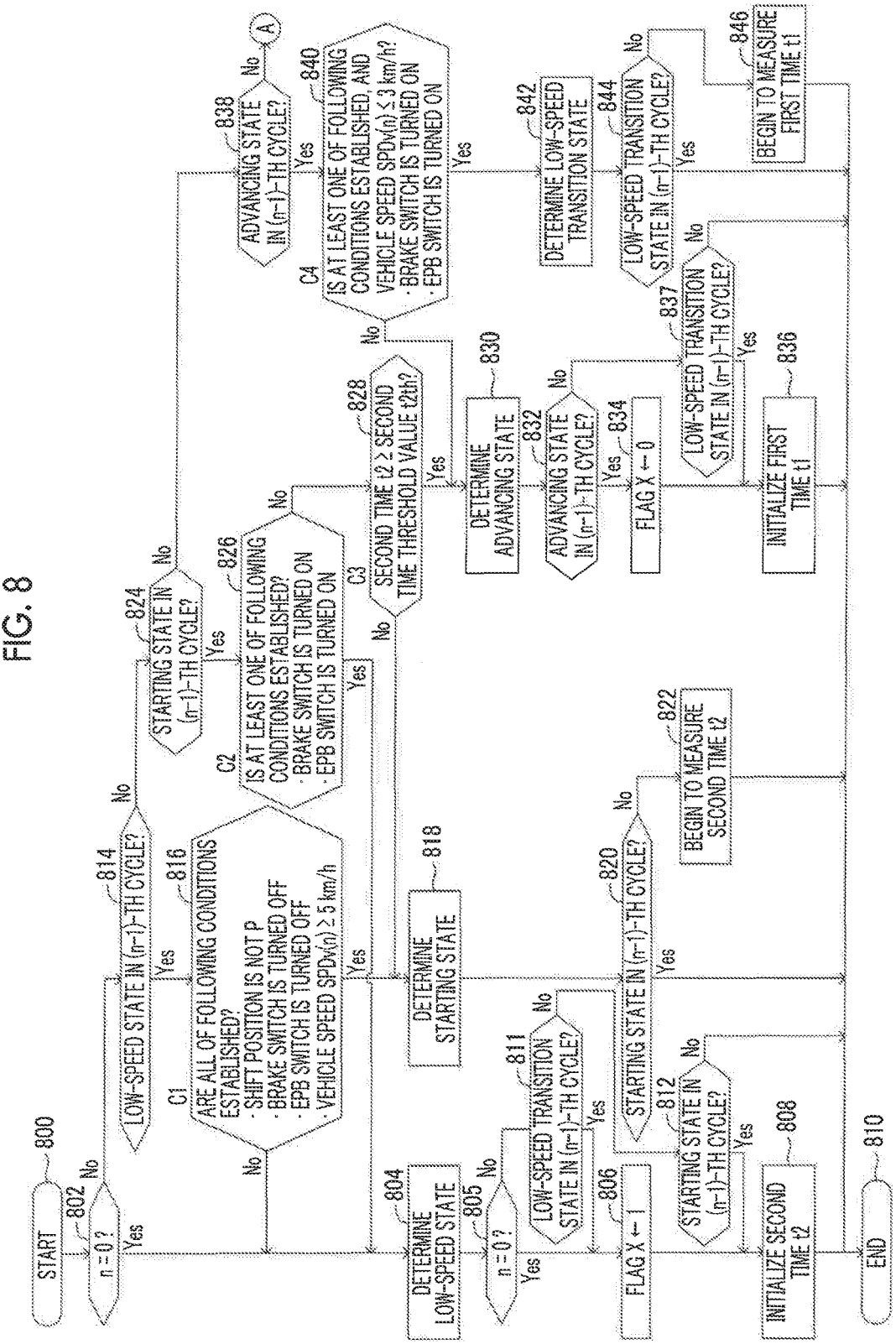
FIG. 8 is a flowchart (second) illustrating a routine executed by the CPU of the present embodiment apparatus.

The CPU starts a process from step 700 in FIG. 7 at a predetermined timing, and performs a process in step 701. In step 701, the CPU acquires host vehicle information (the vehicle speed SPDv(n), the wheel speed WS(n), the yaw rate Y(n), a shift position, a state of the brake switch 15, a state of the EPB switch 16, and the like) of the vehicle 100, and stores the host vehicle information in the RAM of the driving assistance ECU 10.

Next, the CPU proceeds to step 702, and performs a traveling state determination process. In the routine illustrated in FIG. 7, the CPU identifies a traveling state of the vehicle 100 by executing the routines indicated by the flowcharts in FIGS. 8 and 9 in step 702, and sets (maintains) a value of the flag X corresponding to the traveling state. When the CPU proceeds to step 702, the CPU starts a process from step 800 in FIG. 8, and proceeds to the subsequent step 802.

In step 802, the CPU determines whether or not this cycle is a 0-th cycle (n=0) (that is, whether or not this cycle is a cycle at a time point at which the engine switch is turned on). In a case where n=0 is determined, the CPU determines "Yes" in step 802, and performs a process in the subsequent step 804.

In step 804, as described above, a traveling state in the 0-th cycle is defined to be the low-speed state S1. Thus, the CPU determines that a traveling state is the low-speed state S1, and stores the traveling state in the RAM of the driving assistance ECU 10.

Next, the CPU proceeds to step 805, and determines whether or not this cycle is the 0-th cycle (n=0). In this flow, since n=0 is determined in step 802 (YES in step 802), the CPU determines "Yes" in step 805, and performs processes in the subsequent step 806 and step 808 in order.

In step 806, the CPU sets a value of the flag X to 1, and stores the set value in the RAM of the driving assistance ECU 10. In step 808, the CPU initializes the second time t2, and stores the second time t2 (that is, 0) in the RAM of the driving assistance ECU 10. Thereafter, the CPU proceeds to step 703 in FIG. 7 via step 810.

On the other hand, in a case where the CPU determines that this cycle is not the 0-th cycle at a time point at which the process in step 802 is performed (that is, n≥1), the CPU determines "No" in step 802, and proceeds to the subsequent step 814.

In step 814, the CPU determines whether or not a traveling state in the previous cycle ((n−1)-th cycle) is the low-speed state S1. In a case where the CPU determines the low-speed state S1, the CPU determines "Yes" in step 814, and proceeds to the subsequent step 816.

In step 816, the CPU determines whether or not the condition C1 that is a condition for transition of a traveling state from the low-speed state S1 to the starting state S2 is established based on the host vehicle information acquired in step 701 in FIG. 7. In a case where the CPU determines that the condition C1 is established, the CPU determines "Yes" in step 816, and performs a process in the subsequent step 818.

In step 818, the CPU determines that a traveling state is the starting state S2 (that is, a traveling state has transitioned to the starting state S2 from the low-speed state S1), and the CPU stores the traveling state in the RAM of the driving assistance ECU 10.

Next, the CPU proceeds to step 820, and determines whether or not a traveling state in the previous cycle ((n−1)-th cycle) is the starting state S2. In this flow, since the CPU determines that a traveling state in the previous cycle is the low-speed state S1 in step 814 (Yes in step 814), the CPU determines "No" in step 820, and performs a process in the subsequent step 822.

In step 822, the CPU begins to measure the second time t2 (a time period in which a traveling state is the starting state S2). The CPU stores the second time t2 in the RAM of the driving assistance ECU 10. Thereafter, the CPU proceeds to step 703 in FIG. 7 via step 810.

On the other hand, in a case where the CPU determines that the condition C1 is not established at the time point at which the process in step 816 is performed, the CPU determines "No" in step 816, proceeds to the above step 804, determines that a traveling state is the low-speed state S1 (that is, a traveling state is maintained to be the low-speed state S1), and stores the traveling state in the RAM of the driving assistance ECU 10. Thereafter, the CPU proceeds to the above step 805, and determines whether or not this cycle is the 0-th cycle (n=0). In this flow, since the CPU determines that this cycle is the 0-th cycle in step 802 (No in step 802), the CPU determines "No" in step 805, and proceeds to the subsequent step 811.

In step 811, the CPU determines whether or not a traveling state in the previous cycle ((n−1)-th cycle) is the low-speed transition state S4. In this flow, since the CPU determines that a traveling state in the previous cycle is the low-speed state S1 in step 814 (Yes in step S814), the CPU determines "No" in step 811, and proceeds to the subsequent step 812.

In step 812, the CPU determines whether or not a traveling state in the previous cycle ((n−1)-th cycle) is the starting state S2. For the same reason as described above, the CPU determines "No" in step 812, and proceeds to step 703 in FIG. 7 via step 810.

In contrast, in a case where the CPU determines that a traveling state in the previous cycle ((n−1)-th cycle) is not the low-speed state S1 at the time point at which the process in step 814 is performed, the CPU determines "No" in step 814, and proceeds to the subsequent step 824.

In step 824, the CPU determines whether or not a traveling state in the previous cycle ((n−1)-th cycle) is the starting state S2. In a case where the CPU determines that a traveling state is the starting state S2, the CPU determines "Yes" in step 824, and proceeds to the subsequent step 826.

In step S826, the CPU determines whether or not the condition C2 that is a condition for transition of a traveling state from the starting state S2 to the low-speed state S1 is established based on the host vehicle information acquired in step 701 in FIG. 7. In a case where the CPU determines that the condition C2 is established, the CPU determines "Yes" in step 826, proceeds to the above step 804, determines that a traveling state is the low-speed state S1 (that is, a traveling state has transitioned to the low-speed state S1 from the starting state S2), and stores the traveling state in the RAM of the driving assistance ECU 10.

Thereafter, the CPU proceeds to the above step 805. In this flow, the CPU determines that this cycle is not the 0-th cycle in step 802 (No in step 802), and a traveling state in the previous cycle is the starting state S2 in step 824 (Yes in step 824). Thus, the CPU determines "No" in step 805, proceeds to the above step 811, determines "No" in step 811, proceeds to the above step 812, determines "Yes" in step 812, and proceeds to the above step 808. In this flow, since the starting state S2 is not maintained due to the transition of a traveling state from the starting state S2 to the low-speed state S1, the CPU initializes the second time t2 in step 808. The CPU stores the second time t2 (that is, 0) in the RAM of the driving assistance ECU 10. Thereafter, the CPU proceeds to step 703 in FIG. 7 via step 810.

On the other hand, in a case where the CPU determines that the condition C2 is not established at the time point at which the process in step 826 is performed, the CPU determines "No" in step 826, and proceeds to the subsequent step 828.

In step 828, the CPU determines whether or not the condition C3 that is a condition for transition of a traveling state from the starting state S2 to the advancing state S3 is established based on the second time t2 that begins to be measured in step 822. In a case where the CPU determines that the condition C3 is established, the CPU determines "Yes" in step 828, and performs a process in the subsequent step 830.

In step 830, the CPU determines that a traveling state is the advancing state S3 (that is, a traveling state has transitioned to the advancing state S3 from the starting state S2), and stores the traveling state in the RAM of the driving assistance ECU 10.

Next, the CPU proceeds to step 832, and determines whether or not a traveling state in the previous cycle ((n−1)-th cycle) is the starting state S2. In this flow, since the CPU determines that a traveling state in the previous cycle is the starting state S2 in step 824 (Yes in step 824), the CPU determines "Yes" in step 832, and performs processes in the subsequent step 834 and step 836 in order.

In step S834, the CPU sets a value of the flag X to 0, and stores the set value in the RAM of the driving assistance ECU 10. In step 836, the CPU initializes the first time t1, and stores the first time t1 (that is, 0) in the RAM of the driving assistance ECU 10. Thereafter, the CPU proceeds to step 703 in FIG. 7 via step 810.

On the other hand, in a case where the CPU determines that the condition C3 is not established at the time point at which the process in step 828 is performed, the CPU determines "No" in step 828, proceeds to the above step 818, determines that a traveling state is the starting state S2 (that is, a traveling state is maintained to be the starting state S2), and stores the traveling state in the RAM of the driving assistance ECU 10. Thereafter, the CPU proceeds to the above step 820. In this flow, the CPU determines that a traveling state in the previous cycle is the starting state S2 in step 824 (Yes in step S824). Thus, the CPU determines "Yes" in step 820, and proceeds to step 703 in FIG. 7 via step 810.

In contrast, in a case where the CPU determines that a traveling state in the previous cycle ((n−1)-th cycle) is not the starting state S2 at the time point at which the process in step 824 is performed, the CPU determines "No" in step 824, and proceeds to the subsequent step 838.

In step 838, the CPU determines whether or not a traveling state in the previous cycle ((n−1)-th cycle) is the advancing state S3. In a case where the CPU determines that a traveling state is the advancing state S3, the CPU determines "Yes" in step 838, and proceeds to the subsequent step 840.

In step S840, the CPU determines whether or not the condition C4 that is a condition for transition of a traveling state from the advancing state S3 to the low-speed transition state S4 is established based on the host vehicle information acquired in step 701 in FIG. 7. In a case where the CPU determines that the condition C4 is established, the CPU determines "Yes" in step 840, and performs a process in the subsequent step 842.

In step 842, the CPU determines that a traveling state is the low-speed transition state S4 (that is, a traveling state has transitioned to the low-speed transition state S4 from the advancing state S3), and stores the traveling state in the RAM of the driving assistance ECU 10.

Next, the CPU proceeds to step 844, and determines whether or not a traveling state in the previous cycle ((n−1)-th cycle) is the low-speed transition state S4. In this flow, since the CPU determines that a traveling state in the previous cycle is the advancing state S3 in step 838 (Yes in step 838), the CPU determines "No" in step 844, and performs a process in the subsequent step 846.

In step 846, the CPU begins to measure the first time t1 (a time period in which a traveling state is the low-speed transition state S4). The CPU stores the first time t1 in the RAM of the driving assistance ECU 10. Thereafter, the CPU proceeds to step 703 in FIG. 7 via step 810.

On the other hand, in a case where the CPU determines that the condition C4 is not established at the time point at which the process in step 840 is performed, the CPU determines "No" in step 840, proceeds to the above step 830, determines that a traveling state is the advancing state S3 (that is, a traveling state is maintained to be the advancing state S3), and stores the traveling state in the RAM of the driving assistance ECU 10. Thereafter, the CPU proceeds to the above step 832. In this flow, the CPU determines that a traveling state in the previous cycle is the advancing state S3 in step 838 (Yes in step S838). Thus, the CPU determines "No", and proceeds to the subsequent step 832, and proceeds to the subsequent step 837.

In step 837, the CPU determines whether or not a traveling state in the previous cycle ((n−1)-th cycle) is the low-speed transition state S4. For the same reason as described above, the CPU determines "No" in step 837, and proceeds to step 703 in FIG. 7 via step 810.

Figure 9:
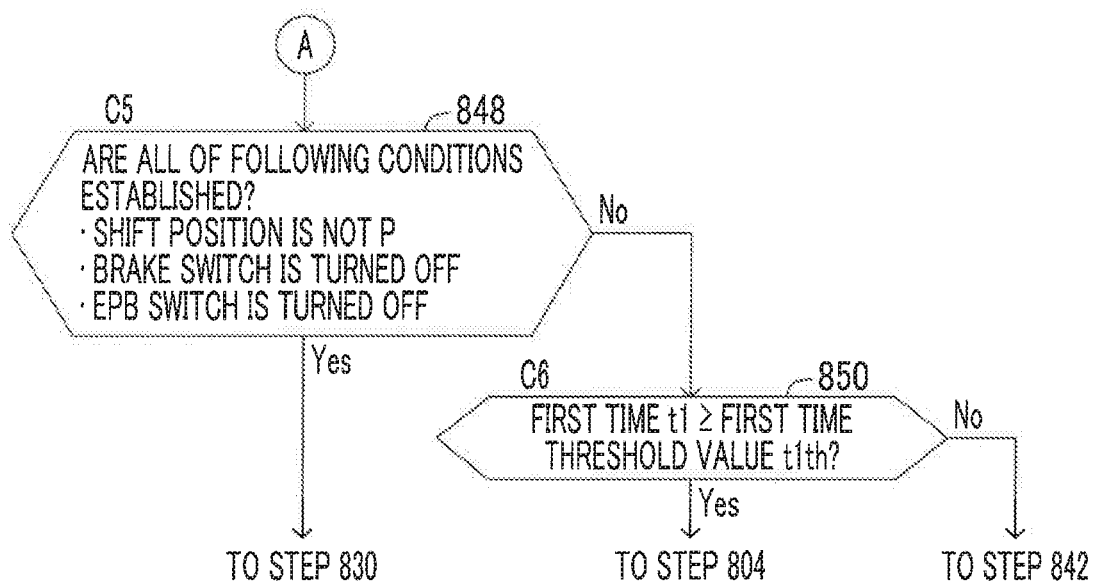
FIG. 9 is a flowchart (third) illustrating a routine executed by the CPU of the present embodiment apparatus.

In contrast, in a case where the CPU determines that a traveling state in the previous cycle ((n−1)-th cycle) is not the advancing state S3 at the time point at which the process in step 838 is performed, the CPU determines "No" in step 838, and proceeds to step 848 in FIG. 9. A case where the CPU determines "No" in step 838 is a case where the CPU determines that a traveling state in the previous cycle is the low-speed transition state S4.

In step S848, the CPU determines whether or not the condition C5 that is a condition for transition of a traveling state from the low-speed transition state S4 to the advancing state S3 is established based on the host vehicle information acquired in step 701 in FIG. 7. In a case where the CPU determines that the condition C5 is established, the CPU determines "Yes" in step 848, proceeds to the above step 830 in FIG. 8, determines that a traveling state is the advancing state S3 (that is, a traveling state has transitioned to the advancing state S3 from the low-speed transition state S4), and stores the traveling state in the RAM of the driving assistance ECU 10.

Thereafter, the CPU proceeds to the above step 832. In this flow, the CPU determines that a traveling state in the previous cycle is the low-speed transition state S4 (No in step 838). Thus, the CPU determines "No" in step 832, proceeds to the above step 837, determines "Yes" in step 837, and proceeds to the above step 836. In this flow, since the low-speed transition state S4 is not maintained due to the transition of a traveling state from the low-speed transition state S4 to the advancing state S3, the CPU initializes the first time t1 in step 836. The CPU stores the first time t1 (that is, 0) in the RAM of the driving assistance ECU 10. Thereafter, the CPU proceeds to step 703 in FIG. 7 via step 810.

On the other hand, in a case where the CPU determines that the condition C5 is not established at the time point at which the process in step 848 in FIG. 9 is performed, the CPU determines "No" in step 848, and proceeds to the subsequent step 850.

In step 850, the CPU determines whether or not the condition C6 that is a condition for transition of a traveling state from the low-speed transition state S4 to the low-speed state S1 is established based on the first time t1 that begins to be measured in step 846. In a case where the CPU determines that the condition C6 is established, the CPU determines "Yes" in step 850, and performs a process in the subsequent step 804 in FIG. 8, determines that a traveling state is the low-speed state S1 (that is, a traveling state has transitioned to the low-speed state S1 from the low-speed transition state S4), and stores the traveling state in the RAM of the driving assistance ECU 10.

Thereafter, the CPU proceeds to the above step 805. In this flow, the CPU determines that this cycle is not the 0-th cycle in step 802 (Yes in step 802), and a traveling state in the previous cycle is the low-speed transition state S4 in step 838 (No in step 838). Thus, the CPU determines "No" in step 805, proceeds to the above step 811, determines "No" in step 811, proceeds to the above step 806, sets a value of the flag X to 1, and stores the set value in the RAM of the driving assistance ECU 10. Thereafter, the CPU proceeds to step 808, and initializes the second time t2 that begins to be measured in step 822. The CPU stores the second time t2 (that is, 0) in the RAM of the driving assistance ECU 10.

On the other hand, in a case where the CPU determines that the condition C6 is not established at the time point at which the process in step 850 is performed, the CPU determines "No" in step 850, proceeds to the above step 842, determines that a traveling state is the low-speed transition state S4 (that is, a traveling state is maintained to be the low-speed transition state S4), and stores the traveling state in the RAM of the driving assistance ECU 10. Thereafter, the CPU proceeds to the above step 844. In this flow, the CPU determines that a traveling state in the previous cycle is the low-speed transition state S4 (No in step 838). Thus, the CPU determines "Yes" in step 844, and proceeds to step 703 in FIG. 7 via step 810.

When the CPU proceeds to step 703 in FIG. 7, the CPU determines the advancing direction TDv(n) of the vehicle 100 based on the host vehicle information acquired in step 701. As described above, the CPU sets coordinate axes (an x axis and a y axis), and stores information indicating the coordinate axes in the RAM of the driving assistance ECU.

Next, the CPU proceeds to step 704, and determines whether or not there is a target on the periphery of the vehicle 100. In a case where the CPU determines that the target is not present, the CPU determines "No" in step 704, proceeds to step 736, and finishes the present routine. On the other hand, in a case where the CPU determines that the target is present, the CPU determines "Yes" in step 704, and performs processes in the subsequent step 706 to step 710 in order.

In step 706, the CPU acquires target information (a coordinate of the relative position P(n), the advancing direction TDo(n), and the speed SPDo(n) of the target) regarding the target as described above, and stores the target information in the RAM of the driving assistance ECU (refer to Equation (4) and Equation (5)). In step 708, the CPU calculates the left expected route expression fL(n) and the right expected route expression fR(n) of the vehicle 100 in the xy coordinate plane, and stores the expressions in the RAM of the driving assistance ECU (refer to Equation (6) and Equation (7)). The CPU estimates a range of $0 \leq x(n) \leq 7$ in the left expected route expression fL(n) as the left expected route, and estimates a range of $0 \leq x(n) \leq 7$ in the right expected route expression fR(n) as the right expected route. In step 710, the CPU selects any single target from among targets having the target information acquired in step 706, and estimates an expected route of the selected target in the xy coordinate plane (that is, the CPU calculates the expected route expression g(n)). The CPU stores the expected route expression g(n) in the RAM of the driving assistance ECU in correlation with the selected target. The CPU separately performs processes from step 710 to step 730 which will be described later for each selected target (refer to step 732 which will be described later).

Next, the CPU proceeds to step 712, and determines whether or not the crossing condition is established with respect to the target selected in step 710. In a case where the CPU determines that the crossing condition is established, the CPU determines "Yes" in step 712, and performs processes in the subsequent step 714 and step 716 in order.

In step 714, the CPU calculates a coordinate of the crossing point Q(n) with a straight line first crossed by a straight line expressed by the expression g(n), of straight lines respectively expressed by the left expected route expression fL(n) and the right expected route expression fR(n), with respect to the target for which the crossing condition is determined as being established in step 712, and stores the coordinate in the RAM of the driving assistance ECU in correlation with the target. In step 716, the CPU calculates the distance d(n) from the vehicle 100 to the crossing point Q(n) calculated in step 714, and stores the distance d(n) in the RAM of the driving assistance ECU in correlation with the target.

Next, the CPU proceeds to step 718, and determines whether or not the first length condition (d(n)≤the first length (in this example, 7 m) of each expected route) is established by using the distance d(n) calculated in step 716 with respect to the target for which the crossing condition is determined as being established in step 712. In a case where the CPU determines that the first length condition is established, the CPU determines "Yes" in step 718, and performs a process in the subsequent step 720.

In step 720, the CPU calculates time t(n) at which the target is expected to reach the crossing point Q(n) in the above-described way, and stores time t(n) in the RAM of the driving assistance ECU in correlation with the target. Thereafter, the CPU proceeds to the subsequent step 722.

In step 722, the CPU determines whether or not the time condition (t(n)≤a threshold time (in this example, 4 s)) is established by using time t(n) calculated in step 720 with respect to the target for which the first length condition is determined as being established in step 718. In a case where the CPU determines that the time condition is established, the CPU determines "Yes" in step 722, and performs a process in the subsequent step 724.

In step 724, the CPU determines whether or not a value of the flag X set in the traveling state determination in step 702 is 1. In a case where the CPU determines that a value of the flag X is 1, the CPU determines that a traveling state of the vehicle 100 is the low-speed state S1 or the starting state S2 (that is, the vehicle speed SPDv(n) of the vehicle 100 is low (including 0)), determines "Yes" in step 724, and proceeds to the subsequent step 726.

In step 726, the CPU determines whether or not the second length condition (d(n)≤the second length (in this example, 3 m) of each expected route) is established by using the distance d(n) calculated in step 716 with respect to the target for which the time condition is determined as being established in step 722. In a case where the CPU determines that the second length condition is established, the CPU determines that the selected target is a target (that is, an objective target) that may probably cross the left expected route and/or the right expected route having the second length within a threshold value, determines "Yes" in step 726, and performs a process in the subsequent step 728.

In step 728, the CPU generates a request signal for the selected target, and transmits the request signal to the display CPU. Consequently, a warning about the selected target is given by the display device 21. Thereafter, the CPU proceeds to the subsequent step 732.

On the other hand, in a case where the CPU determines that a value of the flag X set in the traveling state determination in step 702 is 0, the CPU determines that a traveling state of the vehicle 100 is the advancing state S3 or the low speed transition state S4, determines that the selected target is a target (that is, an objective target) that may probably cross the left expected route and/or the right expected route having the first length within a threshold value, determines "No" in step 724, and performs a process in the above step 728. In other words, in a case where the CPU determines that a value of the flag X is 0, the CPU directly proceeds to step 728 without performing the process in step 726.

In contrast, in a case where the CPU determines that the crossing condition is not established in step 712, determines that the first length condition is not established in step 718, determines that the time condition is not established in step 722, or determines that the second length condition is not established in step 726 when a value of the flag X is determined as being 1 in step 724 (Yes in step 724), the CPU determines that a probability that the selected target may cross the expected route of the vehicle 100 within the threshold value is considerably low, determines "No" in any of step 712, step 718, step 722, and step 726, and performs a process in the subsequent step 730.

In step 730, the CPU does not generate a request signal for the selected target. Thus, a warning about the selected target is not given by the display device 21. Thereafter, the CPU proceeds to the subsequent step 732.

In step 732, the CPU determines whether or not the processes in the above step 710 and the subsequent steps have been performed on all targets having the target information acquired in step 706. In a case where the CPU determines that the processes have not been performed on all of the targets yet, the CPU determines "No" in step 732, returns to step 710, and repeatedly performs the processes in step 710 and the subsequent steps on remaining targets. For example, when a warning about a certain target A is given through the process in step 728, even in a case where the process in step 730 is performed on a target B that is different from the target A, the warning about the target A is continuously performed. For example, when a warning about the target A is performed in the process in step 728, in a case where the process in step 728 is performed on the target B which is different from the target A, a warning about both of the target A and the target B is given. In other words, a determination of whether or not a warning is given is performed separately for each target. On the other hand, in a case where the CPU determines that the processes have been performed on all of the targets, the CPU determines "Yes" in step 732, and performs a process in the subsequent step 734.

In step 734, the CPU initializes a value of the flag X (sets a value thereof to 0). A value of the flag X is initialized by the CPU when the engine switch is changed from an OFF state to an ON state. Thereafter, the CPU proceeds to step 736, and temporarily finishes the present routine.

Advantageous effects of the present embodiment apparatus will be described. In the present embodiment apparatus, a length of each expected route is set to the second length (in this example, 3 m) smaller than the first length (in this example, 7 m) at a time point at which a traveling state is determined as having transitioned to the low-speed state S1 from the low-speed transition state S4. Here, according to the transition conditions C1 to C6 for a traveling state, there is a high probability that the vehicle 100 may travel at the vehicle speed SPDv(n) that is equal to or less than the low-speed transition vehicle speed threshold value SPDvdth (in this example, 3 km/h), or may be stopped, at the time point at which a traveling state is determined as having transitioned to the low-speed state S1 from the low-speed transition state S4. Therefore, according to the present embodiment apparatus, in a case where there is a high probability that the vehicle 100 may travel at the vehicle speed SPDv(n) that is equal to or less than the low-speed transition vehicle speed threshold value SPDvdth, or may be stopped, a predetermined length of each expected route can be set to the second length. Thus, in this case, a length of each expected route can be restrained from being excessively increased, and thus a possibility that an unnecessary warning is given can be considerably reduced. Therefore, a more appropriate warning can be given to a driver of the vehicle 100.

According to the present embodiment apparatus, in a case where a traveling state is determined as being the advancing state S3 and the low-speed transition state S4, a predetermined length of each expected route is set to the first length. In a case where a traveling state is determined as being the low-speed state S1 and the starting state S2, a predetermined length of an expected route is set to the second length smaller than the first length. Here, according to the transition conditions C1 to C6 for a traveling state, in a case where a traveling state is determined as being the advancing state S3, there is a higher probability that the vehicle 100 may advance without being positively decelerated. In a case where a traveling state is determined as being the low-speed transition state S4, there is a higher probability that the vehicle 100 may be decelerated from an advancing state, but time t1 in which the deceleration is being performed does not reach the first time threshold value t1$th$ yet. In a case where a traveling state is determined as being the low-speed state S1, there is a higher probability that the vehicle 100 may travel at the vehicle speed SPDv(n) that is equal to or less than the low-speed transition vehicle speed threshold value SPDvdth, or may be stopped. In a case where a traveling state is determined as being the starting state S2, there is a higher probability that the vehicle 100 may begin to be started, but time t2 in which the starting state is maintained does not reach the second time threshold value t2$th$ yet.

Therefore, according to the present embodiment apparatus, "in a case where there is a higher probability that the vehicle 100 may advance without being positively decelerated (advancing state S3)", and "in a case where there is a higher probability that the vehicle 100 may be decelerated from an advancing state, but time t1 in which the deceleration is being performed does not reach the first time threshold value t1*th* yet (low-speed transition state S4)", a predetermined length of an expected route may be set to the first length. "In a case where there is a higher probability that the vehicle 100 may travel at the vehicle speed SPDv(n) that is equal to or less than the low-speed transition vehicle speed threshold value SPDvdth, or may be stopped (low-speed state S1)", and "in a case where there is a higher probability that the vehicle 100 may begin to be started, but time t2 in which the starting state is maintained does not reach the second time threshold value t2*th* yet (starting state S2)", a predetermined length of an expected route may be set to the second length. According to the above-described configuration, a length of an expected route can be set to an appropriate length corresponding to a traveling state of the vehicle 100, and thus a possibility that an unnecessary warning is given can be considerably reduced. Therefore, a more appropriate warning can be given to a driver of the vehicle 100.

According to the present embodiment apparatus, the braking force is needed to be continuously applied in order to maintain the low-speed transition state S4. Thus, in a case where a traveling state is determined as being the low-speed transition state S4, there is a higher probability that the vehicle 100 may be decelerated from an advancing state. Therefore, a traveling state of the vehicle 100 can be more accurately determined.

According to the present embodiment apparatus, a state in which the braking force is not applied is needed to be maintained in order to maintain the starting state S2. Thus, in a case where a traveling state is determined as being the starting state S2, there is a higher probability that the vehicle 100 may begin to be started. Therefore, a traveling state of the vehicle 100 can be more accurately determined.

As mentioned above, the driving assistance apparatus according to the embodiment of the present disclosure has been described, but an applicable embodiment of the present disclosure is not limited thereto, and various modifications may occur within the scope without departing from the object of the present disclosure.

For example, the traveling state determination process in step 702 in FIG. 7 may be performed at any timing from step 701 to step 724. In other words, the process may be performed at any timing after host vehicle information is acquired and before whether or not a value of the flag X is 1 is determined.

The EPB switch 16 of the present embodiment apparatus may be set to an automatic mode. In the automatic mode, when the shift lever is in the P range, the EPB switch 16 is automatically turned on, and, when the accelerator pedal is pressed in a state in which the shift lever is in the D range (including the ECO range) or the R range, the EPB switch 16 is automatically turned off. In this case, requirements of the condition C1 and the condition C5 do not include the condition 3, and requirements of the condition C2 and the condition C4 do not include the condition 6.

The present embodiment apparatus may be mounted on a vehicle not using an electric parking brake system (that is, a vehicle not including the EPB switch 16). Also in this case, requirements of the condition C1 and the condition C5 do not include the condition 3, and requirements of the condition C2 and the condition C4 do not include the condition 6.

The driving assistance apparatus may include an alarm ECU and a buzzer instead of the display ECU 20 and the display device 21. Specifically, the alarm ECU is connected to the driving assistance ECU 10 via the communication/sensor system CAN 90 such that data can be exchanged therebetween, and the buzzer is connected to the alarm ECU. When the alarm ECU receives a warning request signal from the driving assistance ECU 10, the alarm ECU transmits a command signal to the buzzer. When the buzzer receives the command signal from the alarm ECU, the buzzer sounds the alarm for attracting attention of a driver. With the above-described configuration, the same advantageous effects as in the embodiment device can also be achieved.

The driving assistance apparatus may be configured to estimate one or three or more expected routes instead of estimating two expected routes such as a left expected route and a right expected route. An expected route is not limited to routes (that is, a left expected route and a right expected route) that the left end OL and the right end OR of the vehicle 100 are expected to pass. For example, an expected route may be a route that a position O of the vehicle 100 is expected to pass. Alternatively, a left expected route may be a route that a point separated leftward from the left end OL of the vehicle 100 by a first predetermined distance is expected to pass, and a right expected route may be a route that a point separated rightward from the right end OR of the vehicle 100 by a second predetermined distance is expected to pass.

The driving assistance apparatus may acquire target information by using a camera or a road side machine instead of the radar sensor 17 or in addition to the radar sensor 17.

The driving assistance apparatus may be mounted not solely on a vehicle traveling on a left side of a road but also on a vehicle traveling on a right side of a road.

The driving assistance apparatus may use a value estimated based on lateral acceleration and the vehicle speed SPDv as the yaw rate Y, and may use a value estimated based on a steering angle and the vehicle speed SPDv as the yaw rate Y, instead of using a value detected by the yaw rate sensor 13 as the yaw rate Y.

What is claimed is:
1. A driving assistance apparatus comprising:
a host vehicle information acquisition device configured to acquire host vehicle information including a vehicle speed of a host vehicle and a signal indicating that braking force is applied to the host vehicle by a braking device of the host vehicle;
a target information acquisition device configured to acquire target information including a relative position of a target present on a periphery of the host vehicle for the host vehicle, an advancing direction of the target, and a speed of the target; and
an electronic control device configured to
determine that a traveling state of the host vehicle has transitioned to a low-speed transition state based on the host vehicle information in a case where the vehicle speed is reduced to a first vehicle speed threshold value or less from a vehicle speed more than the first vehicle speed threshold value, and in a case where the braking force is applied,
determine that the traveling state has transitioned to a low-speed state from the low-speed transition state in a case where a state in which the braking force is applied is maintained for a first time threshold value or more from a first time point at which the electronic control device determines that the traveling state has transitioned to the low-speed transition state,
estimate a linear route having a predetermined length extending in an advancing direction of the host vehicle from the host vehicle as an expected route based on the host vehicle information, set the predetermined length of the expected route to a first length at least in a period from the first time point to a second time point at which the traveling state is determined as having transitioned to the low-speed state, and set the predetermined length of the expected route to a second length smaller than the first length at the second time point, determine whether or not there is an objective target as a target that may probably cross the expected route within a time threshold value based on the target information, generate a request signal for warning a driver of the host vehicle in a case where the electronic control device determines that the objective target is present, and warn the driver in response to the request signal.

2. The driving assistance apparatus according to claim 1, wherein:

the electronic control device is configured to determine that the traveling state has transitioned to a starting state from the low-speed state in a case where the vehicle speed increases to a second vehicle speed threshold value or more that is greater than the first vehicle speed threshold value, and the braking force is not applied in a state in which the electronic control device determines that the traveling state has transitioned to the low-speed state;

the electronic control device is configured to determine that the traveling state has transitioned to an advancing state from the starting state in a case where a state in which the braking force is not applied is maintained for a second time threshold value or more from a third time point at which the electronic control device determines that the traveling state has transitioned to the starting state;

the electronic control device is configured to determine that the traveling state has transitioned to the low-speed transition state from the advancing state in a case where the vehicle speed is equal to or less than the first vehicle speed threshold value, and the braking force is applied, in a state in which the electronic control device determines that the traveling state has transitioned to the advancing state;

the electronic control device is configured to set the length to the second length in a case where the electronic control device determines that the traveling state is the low-speed state or the starting state; and the electronic control device is configured to set the length to the first length in a case where the electronic control device determines that the traveling state is the advancing state or the low-speed transition state.

3. The driving assistance apparatus according to claim 2, wherein the electronic control device is configured to determine that the traveling state has transitioned to the advancing state from the low-speed transition state in a case where the braking force is not applied in a state in which the electronic control device determines that the traveling state has transitioned to the low-speed transition state.

4. The driving assistance apparatus according to claim 2, wherein the electronic control device is configured to determine that the traveling state has transitioned to the low-speed state from the starting state in a case where the braking force is applied in a state in which the electronic control device determines that the traveling state has transitioned to the starting state.

* * * * *